United States Patent
Zhao et al.

(10) Patent No.: US 9,648,550 B2
(45) Date of Patent: May 9, 2017

(54) WIRELESS LOCAL AREA NETWORK DISCOVERY AND SELECTION METHOD, DEVICE, AND SYSTEM, AND TERMINAL

(71) Applicant: Huawei Technologies Co., Ltd., Shenzhen (CN)

(72) Inventors: Qiyong Zhao, Shanghai (CN); Xinyou Ma, Shanghai (CN); Yinghao Chen, Shanghai (CN); Ning He, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 302 days.

(21) Appl. No.: 14/511,707

(22) Filed: Oct. 10, 2014

(65) Prior Publication Data
US 2015/0023341 A1    Jan. 22, 2015

Related U.S. Application Data

(63) Continuation of application No. PCT/CN2013/070989, filed on Jan. 25, 2013.

(30) Foreign Application Priority Data

Apr. 10, 2012   (CN) .......................... 2012 1 0103337

(51) Int. Cl.
*H04W 48/16*     (2009.01)
*H04W 48/18*     (2009.01)
(Continued)

(52) U.S. Cl.
CPC .......... *H04W 48/16* (2013.01); *H04W 36/14* (2013.01); *H04W 48/18* (2013.01);
(Continued)

(58) Field of Classification Search
CPC ..... H04W 48/16; H04W 36/14; H04W 48/18; H04W 64/003; H04W 64/006; H04W 84/12
See application file for complete search history.

(56) References Cited

U.S. PATENT DOCUMENTS

2002/0085516 A1    7/2002  Bridgelall
2004/0105416 A1    6/2004  Rue
(Continued)

FOREIGN PATENT DOCUMENTS

CN    1505339 A    6/2004
CN    1614926 A    5/2005
(Continued)

*Primary Examiner* — Ian N Moore
*Assistant Examiner* — Latresa McCallum
(74) *Attorney, Agent, or Firm* — Slater Matsil, LLP

(57) ABSTRACT

The present disclosure provide a wireless local area network discovery and selection method, device, and system, and a terminal. The method includes sending a registration request to a wireless local area network discovery and selection device when packet switched data is initiated to a cellular network. A notification message sent by the wireless local area network discovery and selection device is received. The notification message is sent when the wireless local area network discovery. The selection device determines that a wireless local area network needs to be used to offload the packet switched data in the cellular network. The notification message carries access parameter information.

22 Claims, 9 Drawing Sheets

(51) Int. Cl.
*H04W 64/00* (2009.01)
*H04W 36/14* (2009.01)
*H04W 84/12* (2009.01)

(52) U.S. Cl.
CPC ........ *H04W 64/003* (2013.01); *H04W 64/006* (2013.01); *H04W 84/12* (2013.01)

(56) References Cited

U.S. PATENT DOCUMENTS

| | | |
|---|---|---|
| 2004/0165563 A1 | 8/2004 | Hsu et al. |
| 2006/0217147 A1* | 9/2006 | Olvera-Hernandez ...... H04W 36/005 455/552.1 |
| 2006/0274743 A1 | 12/2006 | Yegin et al. |
| 2007/0140163 A1 | 6/2007 | Meier et al. |
| 2008/0031212 A1 | 2/2008 | Ogura |
| 2008/0102852 A1 | 5/2008 | Du et al. |
| 2009/0245133 A1 | 10/2009 | Gupta et al. |
| 2010/0323698 A1 | 12/2010 | Rune et al. |
| 2011/0222523 A1* | 9/2011 | Fu et al. ............... H04W 36/22 370/338 |
| 2011/0267977 A1 | 11/2011 | Doppler et al. |
| 2011/0286437 A1 | 11/2011 | Austin et al. |

FOREIGN PATENT DOCUMENTS

| | | |
|---|---|---|
| CN | 1617603 A | 5/2005 |
| CN | 1823497 A | 8/2006 |
| CN | 101119263 A | 2/2008 |
| CN | 101449617 A | 6/2009 |
| CN | 101801051 A | 8/2010 |
| CN | 101820628 A | 9/2010 |
| CN | 101986746 A | 3/2011 |
| CN | 102647771 A | 8/2012 |
| EP | 1597868 A2 | 11/2005 |
| WO | 2004077751 A2 | 9/2004 |
| WO | 2009137718 A1 | 11/2009 |

\* cited by examiner

WIRELESS LOCAL AREA NETWORK DISCOVERY AND SELECTION METHOD, DEVICE, AND SYSTEM, AND TERMINAL

This application is a continuation of International Application No. PCT/CN2013/070989, filed on Jan. 25, 2013, which claims priority to Chinese Patent Application No. 201210103337.6, filed on Apr. 10, 2012, both of which are hereby incorporated by reference in their entireties.

TECHNICAL FIELD

Embodiments of the present invention relate to the field of communications technologies and, in particular embodiments, to a wireless local area network discovery and selection method, device, and system, and a terminal.

BACKGROUND

Wireless Fidelity (WiFi) is a technology that may allow a terminal such as a personal computer or a handheld device (for example, a personal digital assistant (PDA) or a mobile phone) to access a wireless local area network (WLAN) in a wireless manner. In the prior art, WiFi hotspots are available in places such airports, cafes, hotels, bookstores, campuses, and the like, which enable a user access emails, Web pages, and streaming media, and provide wireless broadband Internet access for the user. In addition, WiFi is also a fast and convenient way for accessing Internet at home, in an office, or in a journey.

With gradual application and building of 3G network and even future 4G network technologies, all operators have to face a fact that the bandwidth and speed that the operators are originally proud of are confronted with heavy pressure. Therefore, using WiFi to implement offload of packet switched (PS) data and reduce congestion of a cellular data network has been widely recognized by operators in all countries and has been quickly promoted. WiFi offload (Offload) is a technology that uses WiFi to offload data traffic. At present, the operators deploy a large quantity of WiFi hotspots, expecting to offload data services in 3G networks and even future 4G networks. In the prior art, a corresponding WiFi module is generally set in a terminal supporting a WiFi capability. Electric power consumption is huge if WiFi is enabled all the time. Therefore, a user starts the WiFi module only when using WiFi, and searches for a list of accessible wireless access points (APs), and then selects an AP to access.

However, in a process of implementing the present invention, it is found that the prior art has at least the following disadvantage: In the prior art, a user cannot determine a location of a WiFi hotspot and cannot determine timing for enabling a WiFi function. Generally, the user starts the WiFi module only when WiFi is desired, attempts to search for a corresponding list of accessible APs, and stops the WiFi module when no AP is searched out. However, a network cannot assist a terminal in discovering and selecting a WiFi hotspot in an area where the terminal is located so that the terminal can access a WLAN network. Therefore, in the prior art, use efficiency of WiFi discovery and selection is low.

SUMMARY

Embodiments of the present invention provide a wireless local area network discovery and selection method, device, and system, and a terminal to offset a disadvantage of low use efficiency of WiFi discovery and selection in the prior art, which can improve the use efficiency of WiFi discovery and selection.

According to one aspect, an embodiment of the present invention provides a wireless local area network discovery and selection method. When packet switched data is initiated to a cellular network, a registration request is sent to a wireless local area network discovery and selection device. A notification message sent by the wireless local area network discovery and selection device is received. The notification message carries access parameter information. A wireless local area network corresponding to a target wireless access point is selected according to the access parameter information.

According to another aspect, an embodiment of the present invention further provides a wireless local area network discovery and selection method. A registration request sent by a terminal is received. The registration request is initiated when the terminal initiates packet switched data to a cellular network. Access parameter information is acquired when a wireless local area network needs to be used to offload the packet switched data in the cellular network. A notification message carrying the access parameter information is sent to the terminal so that the terminal selects, according to the access parameter information, a wireless local area network corresponding to a target wireless access point.

According to still another aspect, a further embodiment of the present invention provides a terminal. A sending module is configured to send, when packet switched data is initiated to a cellular network, a registration request to a wireless local area network discovery and selection device. A receiving module is configured to receive a notification message sent by the wireless local area network discovery and selection device. The notification message carries access parameter information. A selecting module is configured to select, according to the access parameter information, a wireless local area network corresponding to a target wireless access point.

According to yet another aspect, an embodiment of the present invention further provides a wireless local area network discovery and selection device. A receiving module is configured to receive a registration request sent by a terminal. The registration request is initiated when the terminal initiates packet switched data to a cellular network. An acquiring module is configured to acquire access parameter information when the wireless local area network needs to be used to offload the packet switched data in the cellular network. A sending module is configured to send a notification message carrying the access parameter information to the terminal so that the terminal selects, according to the access parameter information, a wireless local area network corresponding to a target wireless access point.

According to yet still another aspect, an embodiment of the present invention further provides a wireless local area network discovery and selection system, including the foregoing terminal and the foregoing wireless local area network discovery and selection device.

With a wireless local area network discovery and selection method, device, and system, and a terminal in embodiments of the present invention, the terminal sends a registration request to the WLAN discovery and selection device when initiating packet switched data to a cellular network, receives a notification message sent by the WLAN discovery and selection device, where the notification message is sent when the WLAN discovery and selection device determines that a WLAN needs to be used to offload the packet switched data in the cellular network, and the notification message carries access parameter information, and selects a target wireless access point according to the access parameter information. With the technical solutions of the embodiments of the present invention, the foregoing WLAN discovery and selection operations are performed when a terminal initiates packet switched data to a cellular network, which can effectively improve efficiency of WiFi discovery and selection.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, a Long Term Evolution Advanced (LTE-A) system, and a Universal Mobile Telecommunications System (UMTS), which is not limited in the embodiments of the present invention. However, for ease of description, the embodiments of the present invention are described by using an LTE network as an example.

The embodiments of the present invention may be used in radio networks with different standards. A radio access network may include different network elements in different systems. For example, network elements in the radio access network in the LTE and LTE-A include an eNB (eNodeB, evolved NodeB), and network elements in the radio access network in the WCDMA (Wideband Code Division Multiple Access) include an RNC (radio network controller) and a NodeB. Similarly, other radio networks such as WiMAX (Worldwide Interoperability for Microwave Access) may also use solutions similar to those in the embodiments of the present invention, and the only difference is that related modules in a base station system may be different. No limitation is set by the embodiments of the present invention. However, for ease of description, the following embodiments are described by using an eNodeB as an example.

It should also be understood that in the embodiments of the present invention, a terminal may also be referred to as a user equipment (UE), a mobile station (MS), a mobile terminal, and the like. The terminal may communicate with one or more core networks by using a radio access network (RAN). For example, the terminal may be a mobile phone (or referred to as a "cellular" phone), or a computer having a communication function; for example, the terminal may also be a portable, pocket-sized, handheld, computer built-in, or vehicle-mounted mobile apparatus.

Figure 1:
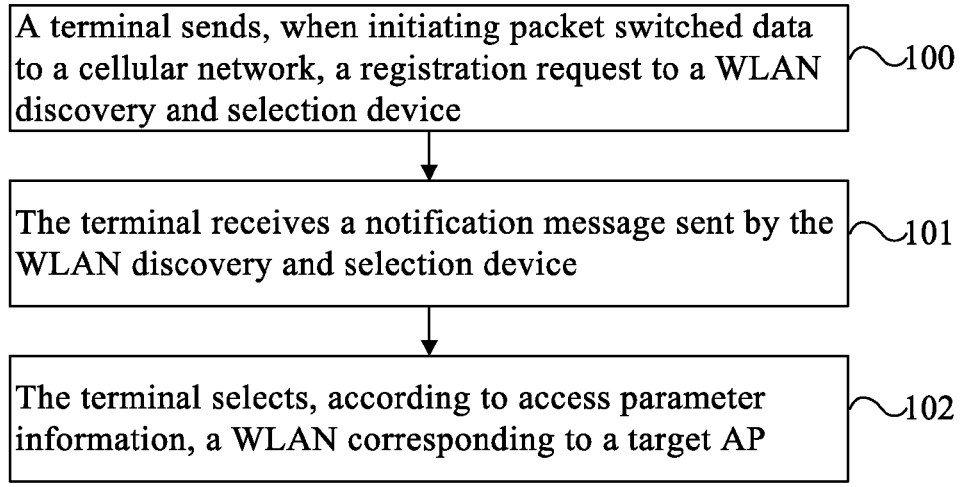
FIG. 1 is a flowchart of a WLAN discovery and selection method according to an embodiment of the present invention.

FIG. 1 is a flowchart of a WLAN discovery and selection method according to an embodiment of the present invention. As shown in FIG. 1, an executor of the WLAN discovery and selection method provided by this embodiment may be a terminal. As shown in FIG. 1, the discovery and selection method provided by this embodiment may specifically include the following steps.

100. A terminal sends, when initiating packet switched data to a cellular network, a registration request to a WLAN discovery and selection device.

101. The terminal receives a notification message sent by the WLAN discovery and selection device.

The notification message in this embodiment is sent when the WLAN discovery and selection device determines that a WLAN needs to be used to offload the packet switched data in the cellular network. The notification message carries access parameter information. The notification message in embodiments of the present invention may also be referred to as a WiFi notification message.

102. The terminal selects, according to the access parameter information, a WLAN corresponding to a target AP.

For example, the foregoing steps 100 to 102 may be specifically as follows: Detection of the terminal may be implemented by a piece of client software installed in the terminal; or may also be implemented by a software module or hardware module that is preconfigured in the terminal, and the terminal sends, where initiating the packet switched data to the cellular network, the registration request to the WLAN discovery and selection device. That the terminal sends the registration request to the WLAN discovery and selection device indicates that the terminal has a WiFi capability. Specifically, the registration request may also carry an identifier indicating that the terminal supports the WiFi capability.

With the WLAN discovery and selection method provided by this embodiment, a registration request is sent to a WLAN discovery and selection device when packet switched data is initiated to a cellular network; a notification message sent by the WLAN discovery and selection device is received, where the notification message is sent when the WLAN discovery and selection device determines that a WLAN needs to be used to offload the packet switched data in the cellular network, and the notification message carries access parameter information; and a target wireless access point is selected according to the access parameter information. With the technical solution of this embodiment, the foregoing WLAN discovery and selection operations are performed when a terminal initiates packet switched data to a cellular network, which can effectively improve efficiency of WiFi discovery and selection.

Optionally, based on the technical solution of the foregoing embodiment shown in FIG. 1, the following optional technical solution may also be included to constitute an optional embodiment of the embodiment shown in FIG. 1.

In the optional embodiment of the embodiment shown in FIG. 1, in step 101, the access parameter information carried in the notification message that the terminal receives from the WLAN discovery and selection device may specifically include a plurality of cases.

Case 1: The access parameter information may include an offload policy message. The offload policy message in this embodiment may be preset in a WLAN discovery and selection module. In this case, accordingly, the target AP is selected by a terminal side and the offload policy message may be used to instruct to select an AP with best signal strength or select an AP in a preset frequency band. For example, the preset frequency band may be a 2.4 GHz frequency band or a 5 GHz frequency band. Or, further, with development of technologies, the preset frequency band may also be any other frequency band, and examples are not provided herein again. All preset frequency bands in the embodiments of the present invention may be the 2.4G frequency band, or the 5.G frequency band, or the any other frequency band, which is not described again in subsequent embodiments.

In this case, accordingly, before "the terminal selects a target AP according to the access parameter information" in step 102 in the foregoing embodiment, specifically, the method may further include the following step: The terminal scans WLANs and acquires a first AP list, where the first AP list includes at least one AP identifier and signal strength of each AP and/or a frequency band of each AP, and may further include an SSID of each AP and the like. For example, when the offload policy message instructs to select an AP with best signal strength, the terminal further acquires the signal strength of each AP when scanning the WLANs, and marks the signal strength of each AP in the first AP list. When the offload policy message instructs to select an AP in a preset frequency band, the terminal further acquires the frequency band of each AP when scanning the WLANs, and marks the frequency band of each AP in the first AP list.

In the embodiments of the present invention, before the terminal scans the WLANs, the method implicitly includes enabling, by the terminal, a WiFi function, which is the same and not described again in subsequent embodiments.

Further, that "the terminal selects a target AP according to the access parameter information" in step 102 in the foregoing embodiment may specifically include the following step: The terminal selects the target AP from the first AP list according to the offload policy message. For example, the terminal may select the target AP from the first AP list, for example, select, from acquired APs, an AP with best signal strength or an AP in a preset frequency band.

Case 2: Based on the foregoing case 1, in addition to an offload policy message, the access parameter information may further include a service set identifier (Service Set Identifier, SSID) of an AP of an accessible WLAN. The first AP list that the terminal acquires by scanning the WLANs in the foregoing case 1 may include an AP that belongs to a different mobile operator network from the cellular network where the terminal is currently located, or an AP that does not share a network with the cellular network where the terminal is currently located. In this case, even if the AP meets a criterion of selecting a target AP in the offload policy message, the terminal still cannot access the target AP. For example, two operators China Mobile Communications Corporation and China Unicom Corporation do not share a network, a terminal belongs to a user of a network of China Mobile, an AP with best signal strength, which is acquired by the terminal by scanning WLANs, is an AP of China Unicom, and an offload policy message is just used to instruct to select an AP with best signal strength. In this case, the terminal still cannot access the AP of China Unicom even if the AP of China Unicom is selected. Therefore, in this case, the offload policy message further needs to carry an SSID of an AP of an accessible WLAN, where the SSID of the AP of the accessible WLAN is specifically used to identify an operator to which an accessible AP belongs. In this embodiment, a plurality of SSIDs of APs of accessible WLANs may be specifically included.

For example, if the cellular network where the terminal is currently located is provided by China Mobile, the SSIDs of the APs of the accessible WLANs in this embodiment should include at least all SSIDs of APs of the network of China Mobile. When China Mobile and China Unicom sign an interoperability agreement in a current region, the SSIDs herein may include all SSIDs of APs of the network of China Mobile and all SSIDs of APs of the network of China Unicom. Likewise, the offload policy message in this embodiment may be preset in a WLAN discovery and selection module and may be used to instruct to select an AP with best signal strength or select an AP in a preset frequency band.

In this case, accordingly, before "the terminal selects a target AP according to the access parameter information" in step 102 in the foregoing embodiment, specifically, the method may further include the following step: The terminal enables a WiFi function, scans WLANs, and acquires a first AP list, where the first AP list includes at least one AP identifier and an SSID of an AP of a WLAN corresponding to each AP.

Further, that "the terminal selects a target AP according to the access parameter information" in step 102 in the foregoing embodiment may specifically include the following: The terminal selects, according to the offload policy message, the SSID of the AP of the accessible WLAN, and the first AP list, the target AP from the first AP list. Specifically, the terminal selects, according to the offload policy message, the SSID of the AP of the accessible WLAN, an SSID of each AP marked in the first AP list, and signal strength of each AP or a frequency band of each AP in the first AP list or both, the target AP from at least one AP included in the first AP list.

For example, the terminal may first acquire, from the first AP list, at least one AP whose SSID belongs to the SSID of the accessible WLAN and then select, according to the offload policy message, the target AP from the acquired AP, for example, select, from the acquired AP, an AP with best signal strength or an AP in a preset frequency band.

Case 3: The access parameter information may include the access parameter include an offload policy message and a second AP list.

Case 3 may be used in a first scenario in which the terminal sends a registration request carrying location information of the terminal to the WLAN discovery and selection device in step 100. The location information of the terminal may be a cell ID of the terminal or latitude and longitude information of the terminal, or may also be other location information that can identify the terminal.

The second AP list is acquired by the WLAN discovery and selection device by acquiring attribute information of each AP in all AP identifiers corresponding to the location information of the terminal upon reception of the registration request and identifying availability of each AP according to the attribute information of each AP in all the AP identifiers corresponding to the location information of the terminal (for example, the cell (Cell) ID of the terminal). The second AP list includes at least one AP identifier available for access by the terminal and attribute information of each AP available for access by the terminal, where the attribute information of each AP available for access by the terminal includes at least one of a signal-to-noise ratio, a load, and throughput. Likewise, the offload policy message in this embodiment may be specifically used to instruct to select an AP with best signal strength, select an AP with a lightest load, or select an AP in a preset frequency band.

In this embodiment, that the WLAN discovery and selection device acquires the attribute information of each AP in all the AP identifiers corresponding to the location information of the terminal may specifically include the following two manners: In a first manner, the WLAN discovery and selection device prestores attribute information of all APs in all access controllers (ACs). The attribute information of all the APs includes attribute information of all APs in each AC. The attribute information of each AP includes at least one of a signal-to-noise ratio, a load, and throughput, and may further include a frequency band of the AP. For example, in this manner, the WLAN discovery and selection device may pre-acquire, from all the ACs, the attribute information of each AP in all the AP identifiers corresponding to the location information of the terminal, or all the ACs periodically report the attribute information of each AP in all the AP identifiers corresponding to the location information of the terminal to the WLAN discovery and selection device. In this way, after receiving the registration request, the WLAN discovery and selection device may acquire, from the attribute information of all the APs in all the ACs, which is stored by the WLAN discovery and selection device, the attribute information of each AP in all the AP identifiers corresponding to the location information of the terminal.

In the first manner, the WLAN discovery and selection device pre-acquires the attribute information of all the APs in all the ACs, which may not be real-time. To solve a disadvantage of the first manner, a second manner may be introduced. In the second manner, the WLAN discovery and selection device further stores a correspondence between location information of a terminal and an AP, and a correspondence between an AP and an AC. The following Table 1 shows an example, in which location information of a terminal is a Cell ID, and a correspondence between a Cell ID and an AP and a correspondence between an AP and an AC are combined. After receiving the registration request, the WLAN discovery and selection device first acquires, according to the Cell ID of the terminal and the correspondence between a Cell ID and an AP, all AP identifiers corresponding to the Cell ID, and acquires, according to the correspondence between an AP and an AC, various AC identifiers corresponding to all the AP identifiers corresponding to the Cell ID, and then interacts with each AC to acquire attribute information of all APs corresponding to the Cell ID.

| AP Identifier | AC Identifier | Cell ID of a Terminal |
| --- | --- | --- |
| AP1 | AC1 | Cell 1 |
| AP2 | AC1 | Cell 1 |
| AP3 | AC1 | Cell 4 |
| AP4 | AC2 | Cell 1 |
| AP5 | AC2 | Cell 1 |
| AP6 | AC2 | Cell 2 |
| AP7 | AC2 | Cell 1 |
| AP8 | AC3 | Cell 2 |
| AP9 | AC3 | Cell 3 |
| AP10 | AC3 | Cell 3 |

Attribute information of an AP includes at least one of a signal-to-noise ratio of the AP, a load of the AP, and throughput of the AP, and may further include a frequency band of the AP. When the offload policy message may be specifically used to instruct to select an AP with a lightest load, the attribute information of the AP must include the load of the AP. The second AP list that the WLAN discovery and selection device acquires by identifying the availability of each AP according to the attribute information of each AP specifically means that: A WLAN discovery and selection module stores an attribute information threshold of AP availability, for example, the WLAN discovery and selection module stores a signal-to-noise ratio threshold, a load threshold, and a throughput threshold of an AP. When a signal-to-noise ratio of an AP is higher than the signal-to-noise threshold, or a load of an AP is higher than the load threshold, or throughput of an AP is higher than the throughput threshold, it is determined that the AP is unavailable; otherwise, when a signal-to-noise ratio of an AP is lower than or equal to the signal-to-noise ratio threshold, or a load of an AP is lower than or equal to the load threshold, or throughput of an AP is lower than or equal to the throughput threshold, the AP is available. In this way, by using the foregoing manner, the second available AP list can be acquired by identifying the availability of each AP according to the attribute information of each AP. Optionally, the attribute information of the AP may further include the frequency band of the AP, for example, whether the AP belongs to a 2.4G frequency band or a 5G frequency band. In this way, subsequently, when the offload policy message is selecting an AP in a preset frequency band, the terminal may make selection directly according to the attribute information of the AP and may not scan a frequency band of each AP any longer.

Accordingly, after the terminal receives a notification message sent by the WLAN discovery and selection device in step 101 and before the terminal selects a target AP according to the access parameter information in step 102 in the foregoing embodiment shown in FIG. 1, the method may further include the following step: The terminal enables a WiFi function, and scans WLANs, and acquires a first AP list, where the first AP list includes at least one AP identifier and may further mark signal strength of each AP.

Accordingly, in step 102 in the foregoing embodiment shown in FIG. 1, that the terminal selects a target AP according to the access parameter information may specifically include the following: The terminal selects, according to the offload policy message, the target AP from an intersection of the first AP list and the second AP list. For example, the terminal may first select at least one AP from the intersection (that is, APs in the intersection can be scanned by the terminal and are available) of the scanned first AP list and the second available AP list sent by the WLAN discovery and selection module, and then select, from the at least one AP, an AP with best signal strength, an AP with a lightest load, or an AP in a preset frequency band as the target AP.

Optionally, case 3 may also be used in a second scenario in which the terminal sends a registration request carrying a first AP list to the WLAN discovery and selection device in step 100.

In this case, accordingly, before "the terminal sends a registration request to the WLAN discovery and selection device" in step 100, the method may further include the following step: The terminal enables a WiFi function, scans WLANs, and acquires a first AP list, where the first AP list includes at least one AP identifier and may further mark signal strength of each AP.

Accordingly, that "the terminal sends a registration request to the WLAN discovery and selection device" in step 100 may specifically include the following: The terminal sends the registration request carrying the first AP list to the WLAN discovery and selection device.

Optionally, the second AP list in this scenario is selected by the WLAN discovery and selection device from the first AP list. The second AP list includes at least one AP identifier available for access by the terminal and attribute information of each AP available for access by the terminal. The offload policy message is used to instruct to select an AP with best signal strength, select an AP with a lightest load, or select an AP in a preset frequency band. A frequency band of each AP may be acquired by scanning on a terminal side or may be acquired from an AC and carried in attribute information of the AP.

For example, the WLAN discovery and selection device may prestore attribute information of all APs (which may be at least one of a signal-to-noise ratio, a load, and throughput of each AP, a frequency band of each AP, and the like) in all ACs. The attribute information may be specifically pre-acquired by the WLAN discovery and selection device from all the ACs or may be periodically reported by all the ACs to the WLAN discovery and selection device. The WLAN discovery and selection device may acquire, from the stored attribute information of all the APs in all the ACs, attribute information corresponding to each AP in the first AP list, identify availability of each AP according to the attribute information of each AP, and form the second AP list by using at least one available AP in the first AP list. The second AP list may further include a frequency band of each available AP. Details are not described herein again, and reference may be made to descriptions of the related embodiment in the first manner of the first scenario in the foregoing case 3. Or the WLAN discovery and selection device prestores a correspondence between an AP and an AC. After receiving the registration request carrying the first AP list, the WLAN discovery and selection device may interact with an AC corresponding to each AP in the first AP list, acquire attribute information of each AP, and then identify the at least one available AP from the first AP list to constitute the second AP list. For the attribute information of the AP and a process of identifying the at least one available AP according to the attribute information of each AP, reference may be made to descriptions of the related embodiment in the second manner of the first scenario in the foregoing case 3, and details are not described herein again.

Further optionally, that "the terminal selects a target AP according to the access parameter information" in step 102 in the foregoing embodiment may specifically include the following: The terminal selects the target AP from the second AP list according to the offload policy message. For example, the terminal selects, from the second AP list, an AP with best signal strength, an AP with a lightest load, or an AP in a preset frequency band as the target AP. For a specific selection implementation process, reference may be made to descriptions of the foregoing related embodiment, and details are not described herein again.

Case 4: The access parameter information includes an identifier of the target AP.

Case 4 is applied in a scenario in which the terminal sends a registration request carrying a first AP list to the WLAN discovery and selection device.

In this case, accordingly, before "the terminal sends a registration request to the WLAN discovery and selection device" in step 100, the method may further include the following step: The terminal enables a WiFi function, scans WLANs, and acquires a first AP list, where the first AP list includes at least one AP identifier and may further mark signal strength of each AP.

Accordingly, that "the terminal sends a registration request to the WLAN discovery and selection device" in step 100 may specifically include the following: The terminal sends the registration request carrying the first AP list to the WLAN discovery and selection device.

In this scenario, the WLAN discovery and selection device interacts with an AC according to the first AP list, selects a second AP list from the first AP list, and acquires, according to an offload policy message, the identifier of the target AP from the second AP list. The second AP list includes at least one AP identifier available for access by the terminal and attribute information of each AP available for access by the terminal. The offload policy message in this solution may be specifically used to instruct to select an AP with a lightest load or select an AP in a preset frequency band.

A difference between case 4 and the second scenario in the foregoing case 3 is that: the WLAN discovery and selection device acquires the target AP from the second AP list according to the offload policy message in case 4, while a process of acquiring the target AP is implemented on a terminal side in the second scenario of case 3. Other implementation processes are the same. Details are not described herein again, and reference may be made to descriptions of the foregoing embodiment.

Further, it should be noted that, based on the foregoing technical solution, after "the target selects a target AP according to the access parameter information" in step 102, the method may further include determining, when the target AP is not detected within a first preset time segment, that offload fails, and disabling a WiFi function. In other embodiments the method may further include disabling a WiFi function when no data traffic of the packet switched data is detected within a second preset time.

The method may further include the following steps: (1) detecting, when access to the WLAN can be accessed by using the target AP, a speed of the terminal in the WLAN; (2) determining, by the terminal, whether the speed is lower than a preset speed threshold, and executing, when the speed is lower than the preset speed threshold or not executing any operation when the speed is higher than or equal to the preset speed threshold; and (3) determining, by the terminal, that the WLAN has poor usability, and disabling a WiFi function.

It should be further noted that, when the foregoing offload fails, the terminal may further report a failure result to the WLAN discovery and selection device so that the WLAN discovery and selection device performs operations such as collecting statistics of a handover success rate and updating an algorithm for determining whether a WLAN needs to be used to offload the packet switched data in the cellular network.

Therefore, in the optional embodiment of the embodiment shown in FIG. 1, a first AP list that a terminal acquires by scanning WLANs may mark signal strength of each AP, a frequency band to which each AP belongs, an SSID of each AP, and the like. Attribute information of an AP, which is acquired by a WLAN discovery and selection device, may include at least one of a signal-to-noise ratio, a load, and throughput of the AP, and may further include a frequency band to which the AP belongs, and the like.

In the optional embodiment of the embodiment shown in FIG. 1, with the foregoing technical solution, the foregoing WLAN discovery and selection operations are performed when a terminal initiates packet switched data to a cellular network, which can effectively improve efficiency of WiFi discovery and selection.

Figure 2:
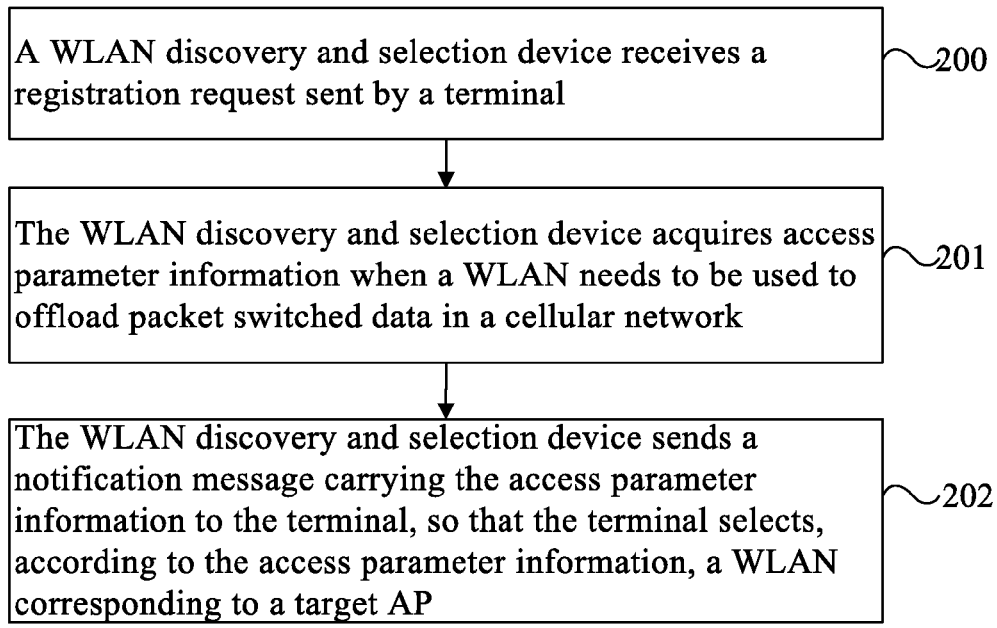
FIG. 2 is a flowchart of a WLAN discovery and selection method according to another embodiment of the present invention.

FIG. 2 is a flowchart of a WLAN discovery and selection method according to another embodiment of the present invention. As shown in FIG. 2, an executor of the WLAN discovery and selection method provided by this embodiment may be a WLAN discovery and selection device. The WLAN discovery and selection method provided by this embodiment may specifically include the following steps:

200. A WLAN discovery and selection device receives a registration request sent by a terminal.

When the terminal initiates packet switched data to a cellular network, the registration request is initiated after a WiFi function is enabled. Therefore, the WLAN discovery and selection device negotiates with the terminal. Sending the registration request indicates that the terminal supports a WiFi capability. Or optionally, the registration request may further carry an identifier indicating that the terminal supports the WiFi capability.

201. The WLAN discovery and selection device acquires access parameter information when a WLAN needs to be used to offload the packet switched data in the cellular network.

202. The WLAN discovery and selection device sends a notification message carrying the access parameter information to the terminal, so that the terminal selects, according to the access parameter information, a WLAN corresponding to a target AP.

A difference between the WLAN discovery and selection method provided by this embodiment and the foregoing embodiment shown in FIG. 1 only lies in that: this embodiment describes a technical solution of the present invention on a WLAN discovery and selection device side, while the foregoing embodiment shown in FIG. 1 describes a technical solution on a terminal side. Details are not described herein again, and reference may be made to descriptions of the foregoing embodiment shown in FIG. 1.

Optionally, in this embodiment, when the WLAN discovery and selection device determines that a WLAN does not need to be used to offload the packet switched data in the cellular network, the WLAN discovery and selection device may also notify the terminal.

With the WLAN discovery and selection method provided by this embodiment, a WLAN discovery and selection device receives a registration request sent by a terminal; and when a WLAN needs to be used to offload packet switched data in a cellular network, the WLAN discovery and selection device acquires access parameter information and sends a notification message carrying the access parameter information to the terminal, so that the terminal selects a target AP according to the access parameter information. With the WLAN discovery and selection method provided by this embodiment, the foregoing WLAN discovery and selection operations are performed when a terminal initiates packet switched data to a cellular network, which can effectively improve efficiency of WiFi discovery and selection.

Optionally, based on the technical solution of the foregoing embodiment shown in FIG. 2, the following optional technical solution may also be included to constitute an optional embodiment of the embodiment shown in FIG. 2.

In the optional embodiment of the embodiment shown in FIG. 2, after step 200 and before step 201 in the foregoing embodiment, the method may further include the following step: The WLAN discovery and selection device determines whether a WLAN needs to be used to offload the packet switched data in the cellular network.

That "the WLAN discovery and selection device determines whether a WLAN needs to be used to offload the packet switched data in the cellular network" in the foregoing step may be specifically determining, according to a service type, whether a WLAN needs to be used to offload the packet switched data in the cellular network. For example, the following steps may be specifically included:

(1) The WLAN discovery and selection device acquires, from a network element in the cellular network (for example, a base station controller (Base Station Controller, BSC) or a radio network controller (Radio Network Controller, RNC)) or a network element in a core network, the service type of the packet switched data.

(2) The WLAN discovery and selection device determines, according to the service type, whether a WLAN needs to be used to offload the packet switched data in the cellular network.

For example, when the WLAN discovery and selection device determines that the service type is a File Transfer Protocol (FTP) download service, the WLAN discovery and selection device determines that a WLAN needs to be used to offload the packet switched data in the cellular network. When the WLAN discovery and selection device determines that the service type is a voice over Internet Protocol (VoIP), the WLAN discovery and selection device determines that a WLAN does not need to be used to offload the packet switched data in the cellular network. When the WLAN discovery and selection device determines that the service type is a multimedia messaging service, the WLAN discovery and selection device determines that a WLAN needs to be used to offload the packet switched data in the cellular network. When the WLAN discovery and selection device determines that the service type is a video service, the WLAN discovery and selection device determines that a WLAN needs to be used to offload the packet switched data in the cellular network. When the WLAN discovery and selection device determines that the service type is an instant messaging service, the WLAN discovery and selection device determines that a WLAN needs to be used to offload the packet switched data in the cellular network.

Or, with respect to each of the foregoing service types that need to use a WLAN to offload the packet switched data in the cellular network, the WLAN discovery and selection device may further acquire a load of the cellular network, for example, acquire the load of the cellular network from the BSC or any other network element, determine whether the load of the cellular network is higher than or equal to a preset load threshold, and when the load of the cellular network is higher than or equal to the preset load threshold, determine a service type that needs to use a WLAN to offload the packet switched data in the cellular network, or otherwise, when the load of the cellular network is lower than the preset load threshold, determine a service type that does not need to use a WLAN to offload the packet switched data in the cellular network.

The foregoing technical solution merely uses the foregoing several service types and cases of using, according to the foregoing several service types, a WLAN to offload packet switched data in a cellular network as an example to describe the technical solutions of the present invention. In actual applications, with development of technologies, other service types may also be used to determine whether a WLAN needs to be used to offload packet switched data in a cellular network, and details are not described herein again.

Optionally, in the optional embodiment of the embodiment shown in FIG. 2, that "the WLAN discovery and selection device determines whether a WLAN needs to be used to offload the packet switched data in the cellular network" in the foregoing step may be specifically determining, according to a priority of a user corresponding to the terminal, whether a WLAN needs to be used to offload the packet switched data in the cellular network. For example, the following steps may be specifically included.

(A) The WLAN discovery and selection device acquires, from a home location register (HLR), the priority of the user corresponding to the terminal. The user corresponding to the terminal refers to a user corresponding to a subscriber identity module (SIM) installed in the terminal.

For example, the HLR stores subscription information of the user corresponding to the terminal. The subscription information stores the priority of the user corresponding to the terminal. For example, in a network of China Mobile, a GoTone user has a highest priority. For each type of users, a network sets a corresponding priority for the users. For a user with a higher priority, it is ensured that the user always enjoys services of the cellular network and data of services corresponding to the user is not offloaded to a WLAN. However, for a user with a lower priority, data of services corresponding to the user is preferentially offloaded to a WLAN when a load of the cellular network is heavy. Therefore, in the cellular network, it is preferentially ensured that the GoTone user is in the cellular network.

(B) The WLAN discovery and selection device determines whether the priority of the user corresponding to the terminal is higher than or equal to a preset priority threshold. When the priority of the user corresponding to the terminal is higher than or equal to the preset priority threshold, step (C) is executed; otherwise, when the priority of the user corresponding to the terminal is lower than the preset priority threshold, step (D) is executed.

Or optionally, when the priority of the user corresponding to the terminal is lower than the preset priority threshold, the WLAN discovery and selection device may also first acquire the load of the cellular network and determine whether the load of the cellular network is higher than or equal to a preset load threshold. When the load of the cellular network is higher than or equal to the preset load threshold, step (D) is executed; otherwise, when the load of the cellular network is lower than the preset load threshold, (C) is executed.

(C) The WLAN discovery and selection device determines that a WLAN does not need to be used to offload the packet switched data in the cellular network. The process ends.

(D) The WLAN discovery and selection device determines that a WLAN needs to be used to offload the packet switched data in the cellular network. The process ends.

Optionally, in the optional embodiment of the embodiment shown in FIG. 2, that "the WLAN discovery and selection device acquires access parameter information" in step 201 may specifically include the following: The WLAN discovery and selection device acquires an offload policy message, where the offload policy message is used to instruct to select an AP with best signal strength or select an AP in a preset frequency band, which is similar to the optional embodiment of the foregoing embodiment shown in FIG. 1.

Accordingly, that "the WLAN discovery and selection device sends a notification message carrying the access parameter information to the terminal" in step 202 may specifically include the following: The WLAN discovery and selection device sends a notification message carrying the offload policy message to the terminal so that the terminal scans WLANs, acquires a first AP list, where the first AP list includes at least one AP identifier and signal strength of each AP or a frequency band of each AP, and selects, according to the offload policy message, the target AP from the first AP list.

Optionally, in the optional embodiment of the embodiment shown in FIG. 2, that "the WLAN discovery and selection device acquires access parameter information" in step 201 may specifically include the following: The WLAN discovery and selection device acquires an offload policy message, an SSID of an AP of a WLAN available for access by the terminal, and signal strength of each AP or a frequency band of each AP, where the offload policy message is used to instruct to select an AP with best signal strength or select an AP in a preset frequency band, which is similar to the optional embodiment of the foregoing embodiment shown in FIG. 1.

Accordingly, that "the WLAN discovery and selection device sends a notification message carrying the access parameter information to the terminal" in step 202 may specifically include the following: The WLAN discovery and selection device sends a notification message carrying the offload policy message and carrying the SSID of the AP of the accessible WLAN to the terminal, so that the terminal scans WLANs, acquires a first AP list, where the first AP list includes at least one AP identifier, an SSID corresponding to each AP, and signal strength of each AP or a frequency band of each AP, and selects, according to the offload policy message, the SSID of the AP of the accessible WLAN, and the first AP list, the target AP from the first AP list.

Optionally, in the optional embodiment of the embodiment shown in FIG. 2, the registration request that the WLAN discovery and selection device receives from the terminal in step 200 in the foregoing embodiment shown in FIG. 2 further carries location information of the terminal. The location information of the terminal may be a cell ID of the terminal or latitude and longitude information of the terminal, or may also be other location information that can identify the terminal.

In this case, accordingly, the access parameter information may specifically include an offload policy information and a second AP list. Accordingly, that "the WLAN discovery and selection device acquires access parameter information" in step 201 may specifically include the following steps.

(11) The WLAN discovery and selection device acquires all AP identifiers corresponding to the location information of the terminal.

(12) The WLAN discovery and selection device acquires attribute information of each AP in all the AP identifiers corresponding to the location information of the terminal.

For example, reference may be made to descriptions in the first scenario of case 2 in the optional embodiment of the embodiment shown in FIG. 1 on the terminal side. The WLAN discovery and selection device may acquire, from prestored attribute information of APs in all ACs, attribute information corresponding to each AP. Specifically, the WLAN discovery and selection device may pre-acquire, from all the ACs, the attribute information of the APs (the attribute information of an AP includes at least one of a signal-to-noise ratio, a load, and throughput of the AP, and may further include a frequency band of the AP, and the like) in all the ACs, or all the ACs periodically report the attribute information of the APs in all the ACs to the WLAN discovery and selection device.

Because the foregoing manner has no real-time performance, when attribute information of an AP in an AC is updated, the attribute information of the APs in all the ACs, which is stored in the WLAN discovery and selection device, is not the latest. In this case, the WLAN discovery and selection device may further interact, according to all the AP identifiers corresponding to the location information of the terminal, with an AC corresponding to each AP identifier and acquire the attribute information of each AP in all the AP identifiers corresponding to the location information of the terminal. The WLAN discovery and selection device prestores a correspondence between an AP and an AC, and a correspondence between location information of a terminal and an AP. For example, the foregoing Table 1 shows one of expression forms.

(13) The WLAN discovery and selection device identifies availability of each AP according to the attribute information corresponding to each AP in all the AP identifiers corresponding to the location information of the terminal and acquires a second AP list, where the second AP list includes at least one AP identifier available for access by the terminal and attribute information of each AP available for access by the terminal.

The attribute information of the AP includes at least one of a signal-to-noise ratio of the AP, a load of the AP, and throughput of the AP. Optionally, the attribute information of the AP may further include a frequency band of the AP, for example, whether the AP belongs to a 2.4G frequency band or a 5G frequency band. When an offload policy message is used to instruct to select an AP with a lightest load, the attribute information of the AP must include the load of the AP.

For example, a WLAN discovery and selection module stores an attribute information threshold of AP availability. For example, the WLAN discovery and selection module stores a signal-to-noise ratio threshold, a load threshold, and a throughput threshold of an AP. When a signal-to-noise ratio of an AP is higher than the signal-to-noise threshold, or a load of an AP is higher than the load threshold, or throughput of an AP is higher than the throughput threshold, it is determined that the AP is unavailable; otherwise, when a signal-to-noise ratio of an AP is lower than or equal to the signal-to-noise ratio threshold, or a load of an AP is lower than or equal to the load threshold, or throughput of an AP is lower than or equal to the throughput threshold, the AP is available. In this way, by using the foregoing manner, the second available AP list can be acquired by identifying the availability of each AP according to the attribute information of each AP.

(14) The WLAN discovery and selection device acquires a preset offload policy information. The offload policy message is used to instruct to select an AP with best signal strength, select an AP with a lightest load, or select an AP in a preset frequency band.

Accordingly, that "the WLAN discovery and selection device sends a notification message carrying the access parameter information to the terminal" in step 202 may specifically include the following: The WLAN discovery and selection device sends a notification message carrying the offload policy information and carrying the second AP list to the terminal, so that the terminal scans WLANs, acquires a first AP list, where the first AP list includes at least one AP identifier, and selects, according to the offload policy message, the target AP from an intersection of the first AP list and the second AP list.

Optionally, in step 200 in the embodiment shown in FIG. 2, the registration request that the WLAN discovery and selection device receives from the terminal further carries a first AP list. The first AP list is acquired by the terminal by scanning WLANs and the first AP list includes at least one AP identifier.

In this case, accordingly, the access parameter information may still include an offload policy information and a second AP list. Accordingly, that "the WLAN discovery and selection device acquires access parameter information" in step 201 may specifically include the following steps:

(21) The WLAN discovery and selection device acquires attribute information corresponding to each AP identifier.

Likewise, the WLAN discovery and selection device may acquire, from prestored attribute information of APs in all ACs, attribute information corresponding to each AP in the first AP list. Specifically, the WLAN discovery and selection device may pre-acquire, from all the ACs, the attribute information of the APs (the attribute information may include at least one of a signal-to-noise ratio, a load, and throughput of an AP, and may further include a frequency band of the AP, and the like) in all the ACs, or all the ACs periodically report the attribute information of the APs in all the ACs to the WLAN discovery and selection device.

Because the foregoing manner has no real-time performance, when attribute information of an AP in an AC is updated, the attribute information of the APs in all the ACs, which is stored in the WLAN discovery and selection device, is not the latest. In this case, the WLAN discovery and selection device may further interact with an AC corresponding to each AP identifier in the first AP list to acquire the attribute information of each AP. The WLAN discovery and selection device prestores a correspondence between an AP and an AC. The WLAN discovery and selection device may acquire, according to the correspondence between an AP and an AC, the AC corresponding to each AP, so as to interact with the AC to acquire the attribute information of each AP.

(22) The WLAN discovery and selection device identifies availability of each AP according to the attribute information corresponding to each AP identifier in the first AP list and selects the second AP list from the first AP list. The second AP list includes at least one AP identifier available for access by the terminal and attribute information of each AP available for access by the terminal.

(23) The WLAN discovery and selection device acquires a preset offload policy information. The offload policy message is used to instruct to select an AP with best signal strength, select an AP with a lightest load, or select an AP in a preset frequency band.

Accordingly, that "the WLAN discovery and selection device sends a notification message carrying the access parameter information to the terminal" in step 202 may specifically include the following: The WLAN discovery and selection device sends a notification message carrying the offload policy information and carrying the second AP list to the terminal, so that the terminal selects, according to the offload policy message, the target AP from the second AP list.

Optionally, step (23) may be specifically replaced by the following step (33).

(33) The WLAN discovery and selection device acquires, according to a preset offload policy information, an identifier of the target AP from the second AP list. The offload policy message is used to instruct to select an AP with a lightest load or select an AP in a preset frequency band.

Accordingly, that "the WLAN discovery and selection device sends a notification message carrying the access parameter information to the terminal" in step 202 may specifically include the following: The WLAN discovery and selection device sends a notification message carrying the identifier of the target AP to the terminal.

It should be further noted that, when the foregoing offload fails, the WLAN discovery and selection device may further receive a failure result reported by the terminal to perform operations such as collecting statistics of a handover success rate and updating an algorithm for determining whether a WLAN needs to be used to offload the packet switched data in the cellular network.

Therefore, in the optional embodiment of the embodiment shown in FIG. 2, a first AP list that a terminal acquires by scanning WLANs may mark signal strength of each AP, a frequency band to which each AP belongs, an SSID of each AP, and the like. Attribute information of an AP, which is acquired by a WLAN discovery and selection device, may include at least one of a signal-to-noise ratio, a load, and throughput of the AP, and may further include a frequency band to which the AP belongs, and the like.

A difference between the optional embodiment of the embodiment shown in FIG. 2 and the optional embodiment of the foregoing embodiment shown in FIG. 1 only lies in that: the optional embodiment of the embodiment shown in FIG. 2 describes a technical solution of the present invention on a WLAN discovery and selection device side, while the optional embodiment of the foregoing embodiment shown in FIG. 1 describes a technical solution of the present invention on a terminal side. Details are not described herein again, and reference may be made to descriptions of the optional embodiment of the foregoing embodiment shown in FIG. 1.

With the WLAN discovery and selection method provided by the foregoing embodiment, the foregoing WLAN discovery and selection operations are performed when a terminal initiates packet switched data to a cellular network, which can effectively improve efficiency of WiFi discovery and selection.

Figure 3:
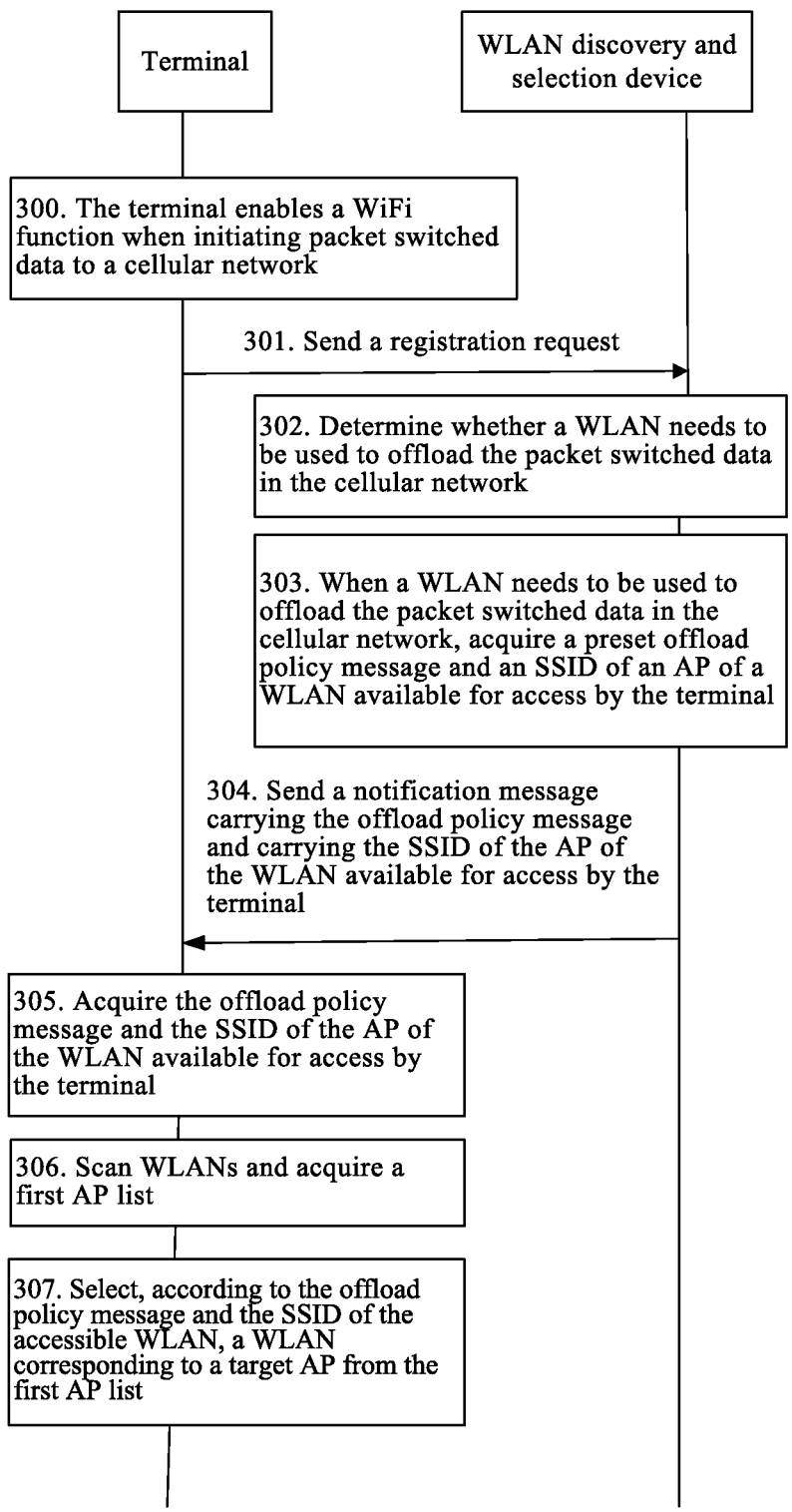
FIG. 3 is a signaling flowchart of a WLAN discovery and selection method according to an embodiment of the present invention.

FIG. 3 is a signaling flowchart of a WLAN discovery and selection method according to an embodiment of the present invention. As shown in FIG. 3, the WLAN discovery and selection method provided by this embodiment may specifically include the following steps.

300. A terminal enables a WiFi function when initiating packet switched data to a cellular network (for example, a BSC).

301. The terminal sends a registration request to a WLAN discovery and selection device.

The registration request may carry an identifier indicating that the terminal has a WiFi capability.

302. The WLAN discovery and selection device determines, after receiving the registration request sent by the terminal, whether a WLAN needs to be used to offload the packet switched data in the cellular network.

For example, the WLAN discovery and selection device may specifically determine, according to a service type or according to a priority of a user corresponding to the terminal, whether a WLAN needs to be used to offload the packet switched data in the cellular network. Details are not described herein again, and reference may be made to descriptions of the foregoing embodiments.

In embodiments of the present invention, the technical solutions of the present invention are described on a basis of an assumption that a WLAN needs to be used to offload the packet switched data in the cellular network. When a WLAN does not need to be used to offload the packet switched data in the cellular network, the WLAN discovery and selection device may also notify the terminal of a result that a WLAN does not need to be used to offload the packet switched data in the cellular network.

303. When a WLAN needs to be used to offload the packet switched data in the cellular network, the WLAN discovery and selection device acquires a preset offload policy message and an SSID of an AP of a WLAN available for access by the terminal.

304. The WLAN discovery and selection device sends a notification message carrying the offload policy message and carrying the SSID of the AP of the WLAN available for access by the terminal to the terminal.

305. The terminal receives, from the WLAN discovery and selection device, the notification message carrying the offload policy message and carrying the SSID of the AP of the WLAN available for access by the terminal, and acquires the offload policy message and the SSID of the AP of the WLAN available for access by the terminal.

306. The terminal scans WLANs and acquires a first AP list, where the first AP list includes at least one AP identifier and an SSID of an AP of a WLAN corresponding to each AP.

307. The terminal selects, according to the offload policy message and the SSID of the AP of the accessible WLAN, a WLAN corresponding to a target AP from the first AP list.

The offload policy message in this embodiment may include selecting an AP with best signal strength or selecting an AP in a preset frequency band, for example, selecting an AP in a 2.4G frequency band or selecting an AP in a 5G frequency band.

Optionally, in this embodiment, an execution sequence of step 300 and any one of steps 301 to 305 may not be limited.

With the WLAN discovery and selection method provided by this embodiment, by using the foregoing technical solution, the foregoing WLAN discovery and selection operations are performed when a terminal initiates packet switched data to a cellular network, which can effectively improve efficiency of WiFi discovery and selection.

Figure 4:
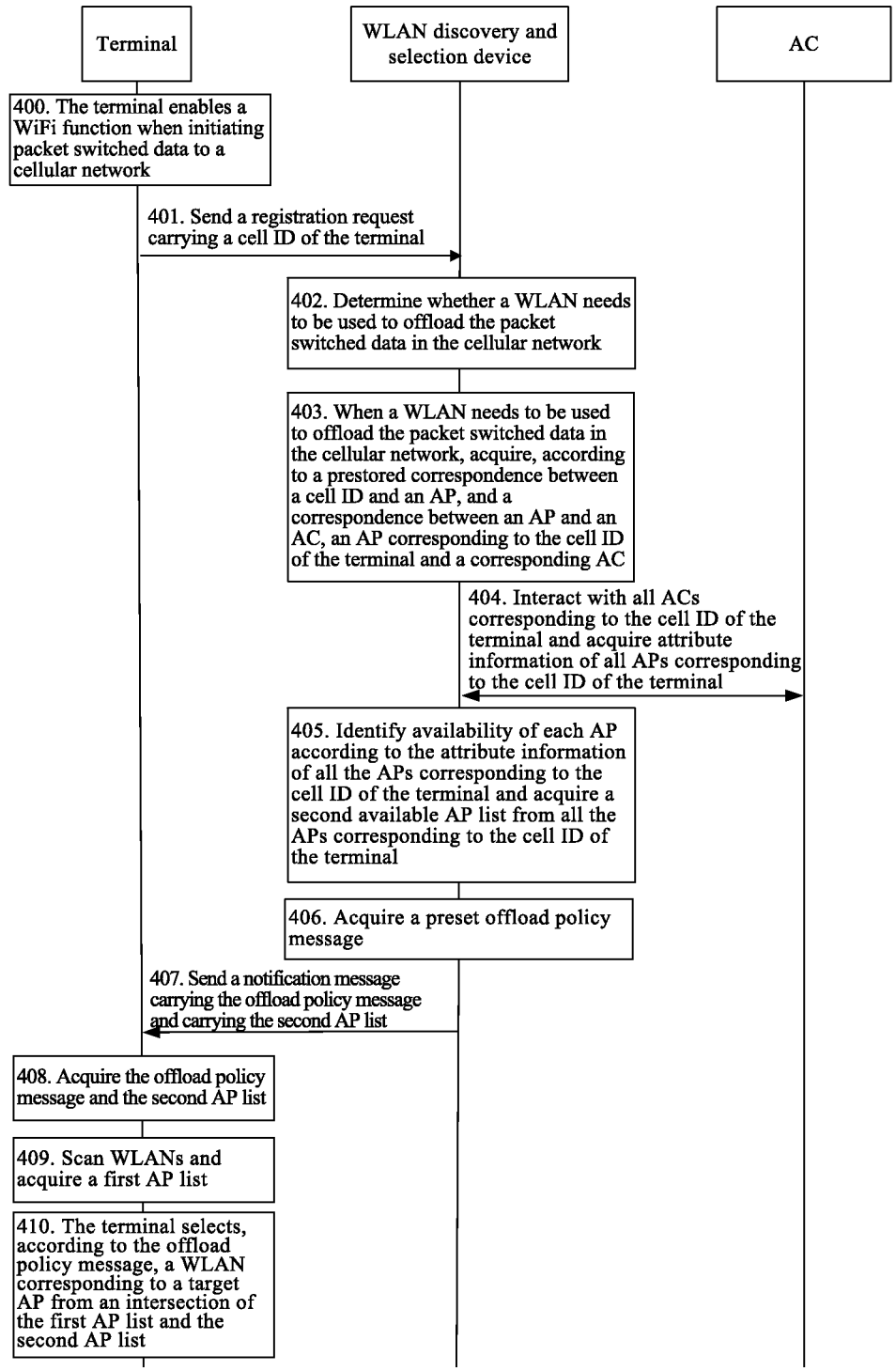
FIG. 4 is a signaling flowchart of a WLAN discovery and selection method according to another embodiment of the present invention.

FIG. 4 is a signaling flowchart of a WLAN discovery and selection method according to another embodiment of the present invention. As shown in FIG. 4, the WLAN discovery and selection method provided by this embodiment may specifically include the following steps:

400. A terminal enables a WiFi function when initiating packet switched data to a cellular network (for example, a BSC).

401. The terminal sends a registration request carrying a cell ID of the terminal to a WLAN discovery and selection device.

In this embodiment, the technology of the present invention is described on a basis of an assumption that location information of the terminal is the cell ID of the terminal.

402. The WLAN discovery and selection device determines, after receiving the registration request sent by the terminal, whether a WLAN needs to be used to offload the packet switched data in the cellular network.

403. When a WLAN needs to be used to offload the packet switched data in the cellular network, the WLAN discovery and selection device acquires, according to a prestored correspondence between a cell ID and an AP, and a correspondence between an AP and an AC, an AP corresponding to the cell ID of the terminal and a corresponding AC.

404. The WLAN discovery and selection device interacts with all ACs corresponding to the cell ID of the terminal and acquires attribute information of all APs corresponding to the cell ID of the terminal. In FIG. 4, one AC is used as an example.

A specific interaction process may be that the WLAN discovery and selection device sends a request for acquiring attribute information of a corresponding AP to each AC and the AC returns the attribute information of the corresponding AP to the WLAN discovery and selection device. In this embodiment, the WLAN discovery and selection device interacts with the ACs and acquires the attribute information of all the APs corresponding to the cell ID of the terminal. In actual applications, all ACs may also periodically report attribute information of all APs to a WLAN discovery and selection device, or a WLAN discovery and selection device pre-acquires the attribute information of all APs from ACs. In this way, the WLAN discovery and selection device may further acquire, from prestored attribute information of the APs in all the ACs, the attribute information of all the APs corresponding to the cell ID of the terminal. Details are not described herein again, and reference may be made to descriptions of the foregoing embodiments.

For example, the attribute information of each AP includes a signal-to-noise of the AP, a load of the AP, and throughput of the AP, or may further include a frequency band of the AP, for example, whether the AP belongs to a 2.4G frequency band or a 5G frequency band.

405. The WLAN discovery and selection device identifies availability of each AP according to the attribute information of all the APs corresponding to the cell ID of the terminal and acquires a second available AP list from all the APs corresponding to the cell ID of the terminal.

The second AP list includes at least one available AP identifier that can be used for access by the terminal and attribute information of each AP.

406. The WLAN discovery and selection device acquires a preset offload policy message.

For example, the offload policy message may specifically be selecting an AP with best signal strength, selecting an AP with a lightest load, or selecting an AP in a preset frequency band, for example, selecting an AP in the 2.4G frequency band or an AP in the 5G frequency band.

407. The WLAN discovery and selection device sends a notification message carrying the offload policy message and carrying the second AP list to the terminal.

408. The terminal receives, from the WLAN discovery and selection device, the notification message carrying the offload policy message and carrying the second AP list, and acquires the offload policy message and the second AP list.

409. The terminal scans WLANs and acquires a first AP list, where the first AP list includes at least one AP identifier.

For example, when the offload policy message is selecting an AP in a preset frequency band, the attribute information of the AP in step 404 may accordingly include the frequency band to which the AP belongs. If the attribute information of the AP does not include the frequency band to which the AP belongs, in step 409, the terminal may also acquire the frequency band to which the AP belongs when scanning the WLANs.

410. The terminal selects, according to the offload policy message, a WLAN corresponding to a target AP from an intersection of the first AP list and the second AP list.

Optionally, in this embodiment, an execution sequence of step 400 and any one of steps 401 to 408 may not be limited.

Therefore, in this embodiment, when sending a registration request to a WLAN discovery and selection device, a terminal may send its own location information and the registration request together to the WLAN discovery and selection device. It should be understood herein that the location information is a broad concept as long as the WLAN discovery and selection device can identify a location of the terminal by using the location information. One implementation manner is that the terminal also sends, when sending the registration request to the WLAN discovery and selection device, the cell ID of the cellular network to the WLAN discovery and selection device.

The foregoing embodiment is used as an example. It is assumed that the terminal sends, when sending a registration request to the WLAN discovery and selection device, a cell ID (for example, a CELL1) of the cellular network where the terminal is located to the WLAN discovery and selection device. The WLAN discovery and selection device queries its own prestored correspondence between a CELL ID and an AP (as shown in Table 1 in the optional embodiment of the foregoing embodiment shown in FIG. 1) for all APs with a cell ID of the cellular network being the CELL 1, for example, an AP1, an AP2, an AP4, an AP5, and an AP7. The five APs constitute a second AP list. When the five APs belong to different ACs, the WLAN discovery and selection device acquires, according to Table 1 in the optional embodiment of the foregoing embodiment shown in FIG. 1, the ACs to which the five APs belong, queries the ACs corresponding to the five APs for specific attribute information (at least one of a signal-to-noise ratio, a load, and throughput, and other information such as a frequency band) of the five APs, marks the queried attribute information of the five APs in the second AP list, and then sends the second AP list to the terminal, so that the terminal selects, from the second AP list, a target AP to access. Or, the WLAN discovery and selection device may also first identify availability of the five APs, and then reserve an available AP that has been identified in the second AP list and deletes an unavailable AP from the second AP list.

That the terminal sends the cell ID of the cellular network to which the terminal belongs while sending the registration request to the WLAN discovery and selection device aims to send only the APs belonging to the cellular network (therefore, in this case, if the terminal sends an ID of a cellular network, it means that the terminal is near the cellular network) to the terminal, so that the terminal can select, from a list including the five APs (the second AP list), one target AP to access.

With the WLAN discovery and selection method provided by this embodiment, by using the foregoing technical solution, the foregoing WLAN discovery and selection operations are performed when a terminal initiates packet switched data to a cellular network, which can effectively improve efficiency of WiFi discovery and selection.

Figure 5:
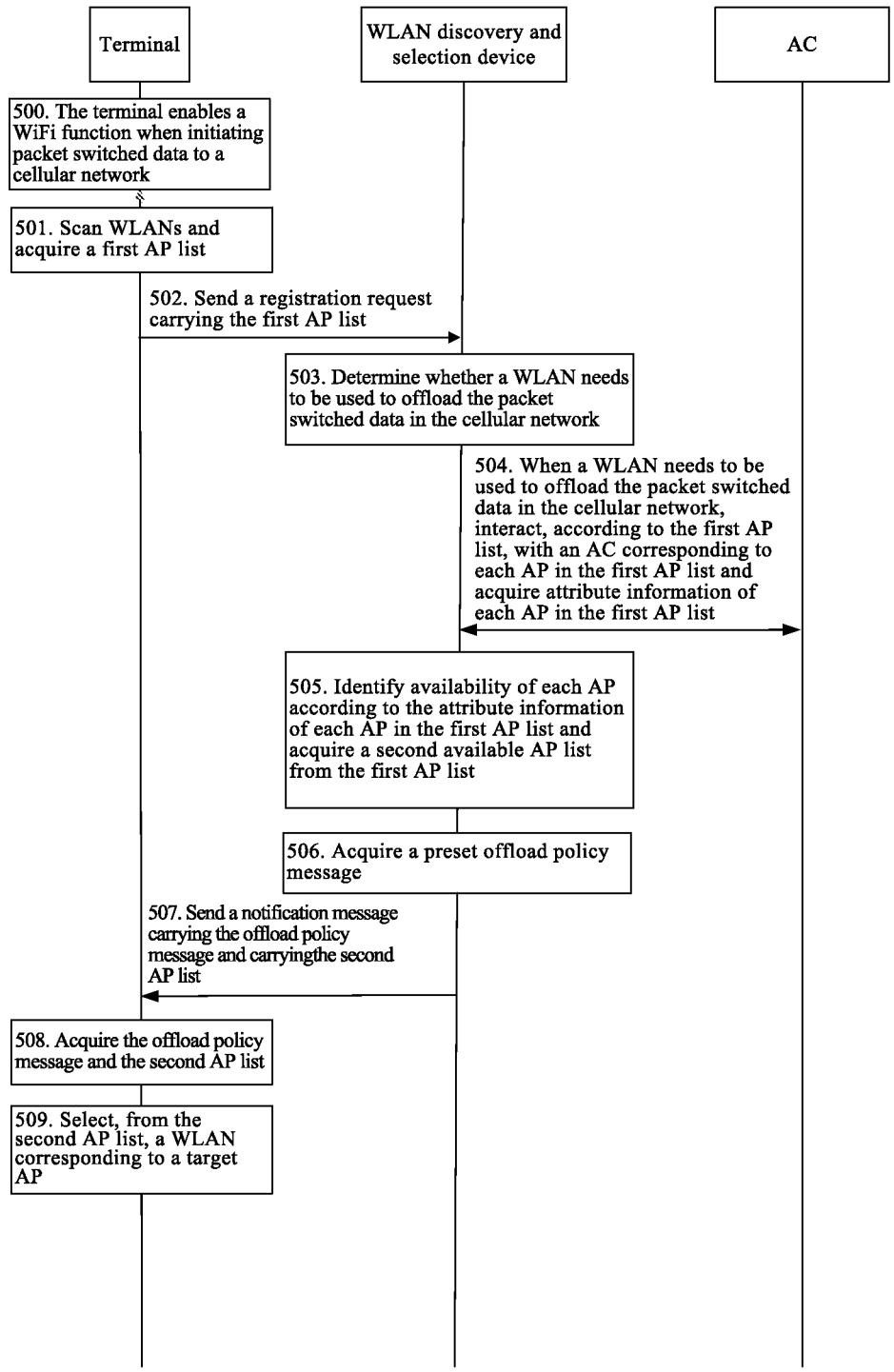
FIG. 5 is a signaling flowchart of a WLAN discovery and selection method according to still another embodiment of the present invention.

FIG. 5 is a signaling flowchart of a WLAN discovery and selection method according to still another embodiment of the present invention. As shown in FIG. 5, the WLAN discovery and selection method provided by this embodiment may specifically include the following steps:

500. A terminal enables a WiFi function when initiating packet switched data to a cellular network (for example, a BSC).

501. The terminal scans WLANs and acquires a first AP list, where the first AP list includes at least one AP identifier.

502. The terminal sends a registration request carrying the first AP list to a WLAN discovery and selection device.

503. The WLAN discovery and selection device determines, after receiving the registration request sent by the terminal, whether a WLAN needs to be used to offload the packet switched data in the cellular network.

504. When a WLAN needs to be used to offload the packet switched data in the cellular network, the WLAN discovery and selection device interacts, according to the first AP list, with an AC corresponding to each AP in the first AP list and acquires attribute information of each AP in the first AP list.

A specific interaction process may be that the WLAN discovery and selection device sends a request for acquiring attribute information of a corresponding AP to each AC and the AC returns the attribute information of the corresponding AP to the WLAN discovery and selection device.

In this embodiment, the WLAN discovery and selection device interacts with the ACs and acquires the attribute information of each AP in the first AP list. In actual applications, all ACs may also periodically report attribute information of all APs to a WLAN discovery and selection device, or a WLAN discovery and selection device pre-acquires the attribute information of all APs from all ACs. In this way, the WLAN discovery and selection device may further acquire, from prestored attribute information of the APs in all the ACs, the attribute information of each AP in the first AP list. Details are not described herein again, and reference may be made to descriptions of the foregoing embodiments.

For example, the attribute information of each AP includes a signal-to-noise of the AP, a load of the AP, and throughput of the AP, or may further include a frequency band of the AP, for example, whether the AP belongs to a 2.4G frequency band or a 5G frequency band.

505. The WLAN discovery and selection device identifies availability of each AP according to the attribute information of each AP in the first AP list and acquires a second available AP list from the first AP list.

The second AP list includes at least one available AP identifier that can be used for access by the terminal and attribute information of each AP.

506. The WLAN discovery and selection device acquires a preset offload policy message.

For example, specifically, the offload policy message may be selecting an AP with best signal strength, selecting an AP with a lightest load, or selecting an AP in a preset frequency band.

507. The WLAN discovery and selection device sends a notification message carrying the offload policy message and carrying the second AP list to the terminal.

508. The terminal receives, from the WLAN discovery and selection device, the notification message carrying the offload policy message and carrying the second AP list, and acquires the offload policy message and the second AP list.

For example, when the offload policy message is selecting an AP in a preset frequency band, the attribute information of the AP in step 504 may accordingly include the frequency band to which the AP belongs. If the attribute information of the AP does not include the frequency band to which the AP belongs, in step 501, the terminal may also acquire the frequency band to which the AP belongs when scanning the WLANs.

509. The terminal selects, according to the offload policy message, a WLAN corresponding to a target AP from the second AP list.

Therefore, in this embodiment, a terminal may also first scan surrounding WLANs and acquire APs that the terminal can detect, where these APs constitute a first AP list, and then send a registration request carrying the first AP list to a WLAN discovery and selection device. It should be noted that: a terminal scans surrounding wireless networks and acquires a first AP list. For example, a total of 10 APs can be scanned in the first AP list. However, the 10 APs may belong to different ACs, for example, belong to AC1 to AC3.

With the WLAN discovery and selection method provided by this embodiment, by using the foregoing technical solution, the foregoing WLAN discovery and selection operations are performed when a terminal initiates packet switched data to a cellular network, which can effectively improve efficiency of WiFi discovery and selection.

Figure 6:
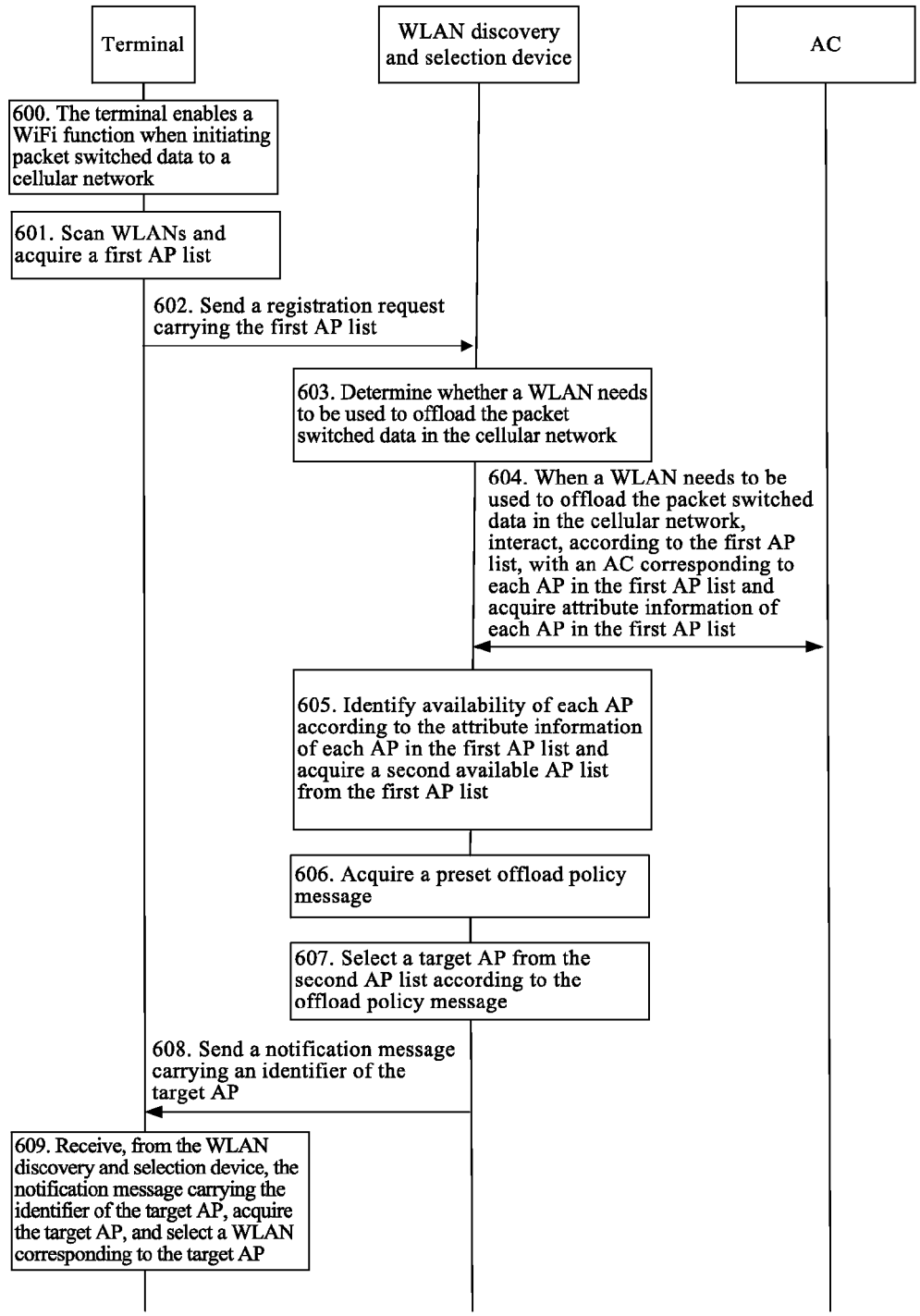
FIG. 6 is a signaling flowchart of a WLAN discovery and selection method according to yet another embodiment of the present invention.

FIG. 6 is a signaling flowchart of a WLAN discovery and selection method according to yet another embodiment of the present invention. As shown in FIG. 6, the WLAN discovery and selection method provided by this embodiment may specifically include the following steps:

Steps 600 to 606 are the same as steps 500 to 506 in the foregoing embodiment shown in FIG. 5. Details are not described herein again, and reference may be made to descriptions of the foregoing embodiment shown in FIG. 5.

607. The WLAN discovery and selection device selects, according to the preset offload policy message, a target AP from the second AP list.

608. The WLAN discovery and selection device sends a notification message carrying an identifier of the target AP to the terminal.

609. The terminal receives, from the WLAN discovery and selection device, the notification message carrying the identifier of the target AP, acquires the target AP, and selects a WLAN corresponding to the target AP.

Because the target AP is selected by the WLAN discovery and selection device in this embodiment, the offload policy message in the technical solution of this embodiment may be preferentially used to instruct to select an AP with a lightest load or select an AP in a preset frequency band. Of course, the offload policy message in the technical solution of this embodiment may also be used to instruct to select an AP with best signal strength. Because signal strength scanning is performed by the terminal, the first AP list that the terminal acquires by scanning WLANs may carry signal strength of each AP, or APs may be sorted by signal strength when the terminal acquires the first AP list.

In this way, when the second available AP list is acquired from the first AP list, the APs are still sorted by signal strength and that the offload policy message is selecting an AP with best signal strength can still be implemented. When the offload policy message is used to instruct to select an AP in a preset frequency band, for example, select an AP in a 2.4G frequency band or select an AP in a 5G frequency band, implementation thereof is the same as implementation of the foregoing embodiment shown in FIG. 5. Details are not described herein again, and reference may be made to descriptions of the foregoing embodiment shown in FIG. 5.

With the WLAN discovery and selection method provided by this embodiment, by using the foregoing technical solution, the foregoing WLAN discovery and selection operations are performed when a terminal initiates packet switched data to a cellular network, which can effectively improve efficiency of WiFi discovery and selection.

Figure 7:
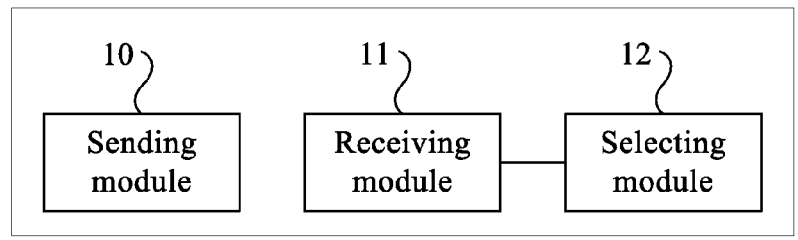
FIG. 7 is a schematic structural diagram of a terminal according to an embodiment of the present invention.

FIG. 7 is a schematic structural diagram of a terminal according to an embodiment of the present invention. As shown in FIG. 7, the terminal provided by this embodiment may specifically include a sending module 10, a receiving module 11, and a selecting module 12.

The sending module 10 is configured to send, when packet switched data is initiated to a cellular network, a registration request to a WLAN discovery and selection device. The receiving module 11 is configured to receive a notification message sent by the WLAN discovery and selection device, where the notification message carries access parameter information. The selecting module 12 is connected to the receiving module 11 and configured to select, according to the access parameter information received by the receiving module 11, a WLAN corresponding to a target AP.

In the terminal provided by this embodiment, an implementation mechanism for implementing WLAN discovery and selection by using the foregoing modules is the same as an implementation mechanism of the foregoing related method embodiment. Details are not described herein again, and reference may be made to descriptions of the foregoing related method embodiment.

By using the foregoing modules, the terminal provided by this embodiment sends, when packet switched data is initiated to a cellular network, a registration request to a WLAN discovery and selection device, receives a notification message sent by the WLAN discovery and selection device, where the notification message carries access parameter information, and selects a target wireless access point according to the access parameter information. With the technical solution of this embodiment, the foregoing WLAN discovery and selection operations are performed when a terminal initiates packet switched data to a cellular network, which can effectively improve efficiency of WiFi discovery and selection.

Figure 8:
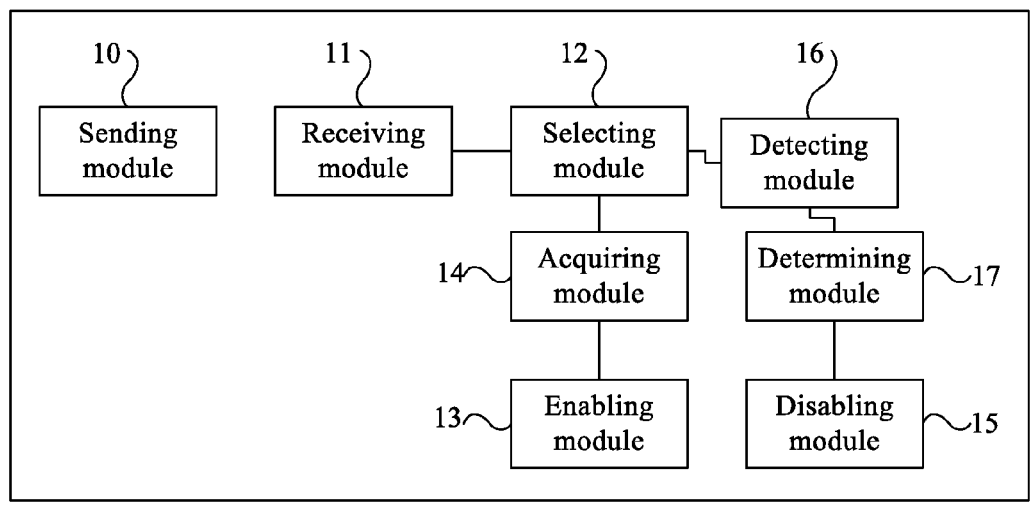
FIG. 8 is a schematic structural diagram of a terminal according to another embodiment of the present invention.

FIG. 8 is a schematic structural diagram of a terminal according to another embodiment of the present invention. As shown in FIG. 8, based on the foregoing embodiment shown in FIG. 7, the terminal provided by this embodiment may further include the following technical solution.

As shown in FIG. 8, in addition to a sending module 10, a receiving module 11, and a selecting module 12, the terminal provided by this embodiment further includes an enabling module 13 and an acquiring module 14. The receiving module 11 is specifically configured to receive, from a WLAN discovery and selection device, a notification message carrying an offload policy message, where the offload policy message is used to instruct to select an AP with best signal strength or select an AP in a preset frequency band. The enabling module 13 is configured to enable a WiFi function before the selecting module 12 selects, according to access parameter information, a WLAN corresponding to a target AP. The acquiring module 14 is connected to the enabling module 13 and configured to scan, after the enabling module 13 enables WiFi, WLANs and acquires a first AP list, where the first AP list includes at least one AP identifier and signal strength of each AP or a frequency band of each AP. Accordingly, the selecting module 12 is further connected to the acquiring module 14. The selecting module 12 is specifically configured to select, according to the offload policy message received by the receiving module 11, the WLAN corresponding to the target AP from the first AP list acquired by the acquiring module 14.

Or optionally, the receiving module 11 in the terminal provided by this embodiment is specifically configured to receive, from the WLAN discovery and selection device, a notification message carrying an offload policy message and carrying an SSID of an AP of an accessible WLAN, where the offload policy message is used to instruct to select an AP with best signal strength or select an AP in a preset frequency band. The enabling module 13 is configured to enable a WiFi function after the receiving module 11 receives the notification message sent by the WLAN discovery and selection device and before the selecting module 12 selects, according to access parameter information, a WLAN corresponding to a target AP. The acquiring module 14 is configured to scan, after the enabling module 13 enables WiFi, WLANs and acquires a first AP list, where the first AP list includes at least one AP identifier and signal strength of each AP or a frequency band of each AP. Accordingly, the selecting module 12 is specifically configured to select, according to the offload policy message and the SSID of the AP of the WLAN, which are received by the receiving module 11, and the first AP list acquired by the acquiring module 14, the WLAN corresponding to the target AP from the first AP.

Or optionally, the sending module 10 in the terminal provided by this embodiment is specifically configured to send a registration request carrying location information of the terminal to the WLAN discovery and selection device. The receiving module 11 is specifically configured to receive, from the WLAN discovery and selection device, a notification message carrying an offload policy message and carrying a second AP list. The second AP list is acquired by the WLAN discovery and selection device by acquiring attribute information of each AP in all AP identifiers corresponding to the location information of the terminal upon reception of the registration request and identifying availability of each AP according to the attribute information of each AP in all the AP identifiers corresponding to the location information of the terminal. The second AP list includes at least one AP identifier available for access by the terminal and attribute information of each AP available for access by the terminal, where the attribute information includes at least one of a signal-to-noise ratio, a load, and throughput. The offload policy message is used to instruct to select an AP with best signal strength, select an AP with a lightest load, or select an AP in a preset frequency band.

In this case, accordingly, the enabling module 13 is configured to enable a WiFi function after the receiving module 11 receives the notification message sent by the WLAN discovery and selection device and before the selecting module 12 selects, according to access parameter information, a WLAN corresponding to a target AP. The acquiring module 14 is configured to scan WLANs and acquires a first AP list, where the first AP list includes at least one AP identifier. The selecting module 12 is specifically configured to select, according to the offload policy message received by the receiving module 11, the WLAN corresponding to the target AP from an intersection of the first AP list acquired by the acquiring module 14 and the second AP list received by the receiving module 11.

Or optionally, the enabling module 13 in the terminal provided by this embodiment is configured to enable a WiFi function before the sending module 10 sends a registration request to the WLAN discovery and selection device. The acquiring module 14 is configured to scan WLANs and acquire a first AP list, where the first AP list includes at least one AP identifier and signal strength of each AP in the at least one AP identifier. The sending module 10 is specifically configured to send a registration request carrying the first AP list to the WLAN discovery and selection device.

Further optionally, the receiving module 11 is specifically configured to receive, from the WLAN discovery and selection device, a notification message carrying an offload policy message and carrying a second AP list. The second AP list is selected by the WLAN discovery and selection device from the first AP list. The second AP list includes at least one AP identifier available for access by the terminal and attribute information of each AP available for access by the terminal, where the attribute information includes at least one of a signal-to-noise ratio, a load, and throughput. The offload policy message is used to instruct to select an AP with best signal strength, select an AP with a lightest load, or select an AP in a preset frequency band. The selecting module 12 is specifically configured to select, according to the offload policy message, a WLAN corresponding to a target AP from the second AP list.

Or further optionally, the receiving module 11 is specifically configured to receive, from the WLAN discovery and selection device, a notification message carrying an identifier of a target AP. The WLAN discovery and selection device interacts with an AC according to a first AP list, selects a second AP list from the first AP list, and acquires, according to an offload policy message, the identifier of the target AP from the second AP list. The second AP list includes at least one AP identifier available for access by the terminal and attribute information of each AP available for access by the terminal, where the attribute information includes at least one of a signal-to-noise ratio, a load, and throughput. The offload policy message is used to instruct to select an AP with a lightest load or select an AP in a preset frequency band. The selecting module 12 is specifically configured to acquire an AP corresponding to the identifier of the target AP in the notification message as the target AP.

Optionally, based on the foregoing technical solution, the terminal provided by this embodiment further includes a disabling module 15. The disabling module 15 may be connected to the selecting module 12 (this case is not shown in FIG. 8). The disabling module 15 is configured to determine, after the selecting module 12 selects, according to the access parameter information, the WLAN corresponding to the target AP, that offload fails when the target AP is not detected within a first preset time segment, and disable the WiFi function; or the disabling module 15 is configured to disable, after the selecting module 12 selects the target AP according to the access parameter information, the WiFi function when no data traffic of the packet switched data is detected within a second preset time segment.

Or optionally, based on the foregoing technical solution, the terminal provided by this embodiment further includes a disabling module 15, a detecting module 16, and a determining module 17. The detecting module 16 is configured to detect, after the selecting module 12 selects, according to the access parameter information, the WLAN corresponding to the target AP, a speed in the WLAN when the WLAN can be accessed by using the target AP. The determining module 17 is connected to the detecting module 16. The determining module 17 is configured to determine whether the speed detected by the detecting module 16 is lower than a preset speed threshold. The disabling module 15 is connected to the determining module 17. The disabling module 15 is configured to determine, when the determining module 17 determines that the speed detected by the detecting module 16 is lower than the preset speed threshold, that the WLAN has poor usability, and disable the WiFi function.

The technical solutions of the present invention are described in detail on a basis of an assumption that the terminal provided by this embodiment includes all the foregoing optional technical solutions. In actual applications, all the foregoing optional technical solutions may be combined in any manner to constitute an optional embodiment of the present invention, and details are not described herein again.

In the terminal provided by this embodiment, an implementation mechanism for implementing WLAN discovery and selection by using the foregoing modules is the same as an implementation mechanism of the foregoing related method embodiment. Details are not described herein again, and reference may be made to descriptions of the foregoing related method embodiment.

With the terminal provided by this embodiment, by using the foregoing technical solutions, the foregoing WLAN discovery and selection operations are performed when the terminal initiates packet switched data to a cellular network, which can effectively improve efficiency of WiFi discovery and selection.

Figure 9:
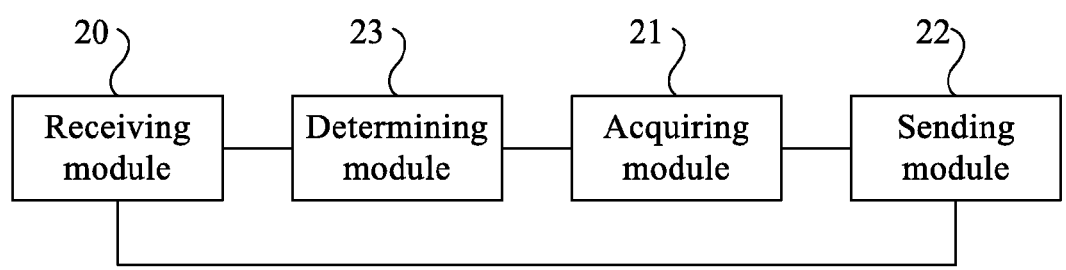
FIG. 9 is a schematic structural diagram of a WLAN discovery and selection device according to an embodiment of the present invention.

FIG. 9 is a schematic structural diagram of a WLAN discovery and selection device according to an embodiment of the present invention. As shown in FIG. 9, the WLAN discovery and selection device provided by this embodiment may specifically include a receiving module 20, an acquiring module 21, and a sending module 22.

The receiving module 20 is configured to receive a registration request sent by a terminal, where the registration request is initiated when the terminal initiates packet switched data to a cellular network. The acquiring module 21 is configured to acquire, after the receiving module 20 receives the registration request, access parameter information when a WLAN needs to be used to offload the packet switched data in the cellular network. The sending module 22 is connected to the acquiring module 21. The sending module 22 is configured to send a notification message carrying the access parameter information acquired by the acquiring module 21 to the terminal, so that the terminal selects, according to the access parameter information, a WLAN corresponding to a target AP.

In the WLAN discovery and selection device provided by this embodiment, an implementation mechanism for implementing WLAN discovery and selection by using the foregoing modules is the same as an implementation mechanism of the foregoing related method embodiment. Details are not described herein again, and reference may be made to descriptions of the foregoing related method embodiment.

By using the foregoing modules, the WLAN discovery and selection device provided by this embodiment receives a registration request sent by a terminal, and determines whether a WLAN needs to be used to offload packet switched data in a cellular network; and when a WLAN needs to be used to offload the packet switched data in the cellular network, the WLAN discovery and selection device acquires access parameter information and sends a notification message carrying the access parameter information to the terminal, so that the terminal selects, according to the access parameter information, a WLAN corresponding to a target AP. With the WLAN discovery and selection device provided by this embodiment, the foregoing WLAN discovery and selection operations are performed when a terminal initiates packet switched data to a cellular network, which can effectively improve efficiency of WiFi discovery and selection.

Optionally, based on the foregoing embodiment shown in FIG. 9, the following technical solution may further be included:

The WLAN discovery and selection device provided by the embodiment shown in FIG. 9 further includes a determining module 23. The determining module 23 is connected to the receiving module 20. The determining module 23 is configured to determine, after the receiving module 20 receives the registration request, whether a WLAN needs to be used to offload the packet switched data in the packet switched data service initiated by the terminal in the cellular network. The acquiring module 21 is connected to the determining module 23. The acquiring module 21 is configured to acquire the access parameter information according to a determination result of the determining module 23 when a WLAN needs to be used to offload the packet switched data in the cellular network.

For example, the determining module 23 is specifically configured to acquire a service type of the packet switched data from a network element in the cellular network or a network element in a core network, and determine, according to the service type, whether a WLAN needs to be used to offload the packet switched data in the cellular network. For example, when the WLAN discovery and selection device determines that the service type is an FTP download service, the WLAN discovery and selection device determines that a WLAN needs to be used to offload the packet switched data in the cellular network. When the WLAN discovery and selection device determines that the service type is a VoIP voice service, the WLAN discovery and selection device determines that a WLAN does not need to be used to offload the packet switched data in the cellular network.

When the WLAN discovery and selection device determines that the service type is a multimedia messaging service, the WLAN discovery and selection device determines that a WLAN needs to be used to offload the packet switched data in the cellular network. When the WLAN discovery and selection device determines that the service type is a video service, the WLAN discovery and selection device determines that a WLAN needs to be used to offload the packet switched data in the cellular network. When the WLAN discovery and selection device determines that the service type is an instant messaging service, the WLAN discovery and selection device determines that a WLAN needs to be used to offload the packet switched data in the cellular network.

Or, with respect to each of the foregoing service types that need to use a WLAN to offload the packet switched data in the cellular network, the determining module 23 in the WLAN discovery and selection device may further acquire a load of the cellular network, for example, acquire the load of the cellular network from a BSC or any other network element, determine whether the load of the cellular network is higher than or equal to a preset load threshold, and when the load of the cellular network is higher than or equal to the preset load threshold, determine a service type that needs to use a WLAN to offload the packet switched data in the cellular network, or otherwise, when the load of the cellular network is lower than the preset load threshold, determine a service type that does not need to use a WLAN to offload the packet switched data in the cellular network.

Or optionally, the determining module 23 in the WLAN discovery and selection device provided by the embodiment shown in FIG. 9 is specifically configured to acquire, from a home location register, a priority of a user corresponding to the terminal, determine whether the priority of the user corresponding to the terminal is higher than or equal to a preset priority threshold, and when the priority of the user corresponding to the terminal is higher than or equal to the preset priority threshold, determine that a WLAN does not need to be used to offload the packet switched data in the cellular network, or otherwise, when the priority of the user corresponding to the terminal is lower than the preset priority threshold, determine that a WLAN needs to be used to offload the packet switched data in the cellular network.

Further optionally, based on the foregoing technical solution, the acquiring module 21 in the WLAN discovery and selection device provided by the embodiment in FIG. 9 is specifically configured to acquire an offload policy message, where the offload policy message is used to instruct to select an AP with best signal strength or select an AP in a preset frequency band. The sending module 22 is specifically configured to send a notification message carrying the offload policy message acquired by the acquiring module 21 to the terminal, so that the terminal enables a WiFi function, scans WLANs, acquires a first AP list, where the first AP list includes at least one AP identifier and signal strength of each AP or a frequency band of each AP, and selects, according to the offload policy message, the WLAN corresponding to the target AP.

Or further optionally, based on the foregoing technical solution, the acquiring module 21 in the WLAN discovery and selection device provided by the embodiment in FIG. 9 is specifically configured to acquire an offload policy message and an SSID of an AP of a WLAN available for access by the terminal, where the offload policy message is used to instruct to select an AP with best signal strength or select an AP in a preset frequency band. The sending module 22 is specifically configured to send a notification message carrying the offload policy message and carrying the SSID of the AP of the accessible WLAN, which are acquired by the acquiring module 21, to the terminal, so that the terminal enables a WiFi function, scans WLANs, acquires a first AP list, where the first AP list includes at least one AP identifier, an SSID of an AP of a WLAN corresponding to each AP, and signal strength of each AP or a frequency band of each AP, and selects, according to the offload policy message, the SSID of the AP of the accessible WLAN, and the first AP list, the WLAN corresponding to the target AP from the first AP list.

Or further optionally, based on the foregoing technical solution, the receiving module 20 in the WLAN discovery and selection device provided by the embodiment shown in FIG. 9 is specifically configured to receive, from the terminal, a registration request carrying location information of the terminal. The acquiring module 21 is further connected to the receiving module 20. The acquiring module 21 is specifically configured to acquire attribute information of each AP corresponding to the location information of the terminal in the registration request received by the receiving module 20.

For example, the acquiring module 21 may be specifically configured to acquire all AP identifiers corresponding to the location information of the terminal in the registration request received by the receiving module 20 and then acquire attribute information of each AP in all the AP identifiers corresponding to the location information of the terminal. For the acquiring, by the acquiring module 21, the attribute information of each AP in all the AP identifiers corresponding to the location information of the terminal, reference may be made to the two manners in the foregoing method embodiments.

In a first manner, the acquiring module 21 acquires, from prestored attribute information of APs in all ACs (including attribute information of all APs in each AC in all the ACs), the attribute information of each AP in all the AP identifiers corresponding to the location information of the terminal. In a second manner, the acquiring module 21 may interact, according to all the AP identifiers corresponding to the location information of the terminal, with an AC corresponding to each AP identifier and acquire the attribute information of each AP in all the AP identifiers corresponding to the location information of the terminal, where the attribute information includes at least one of a signal-to-noise ratio, a load, and throughput; identify availability of each AP according to the attribute information corresponding to each AP in all the AP identifiers corresponding to the location information of the terminal and acquire a second AP list, where the second AP list includes at least one AP identifier available for access by the terminal and attribute information of each AP available for access by the terminal; and acquire a preset offload policy information, where the offload policy message is used to instruct to select an AP with best signal strength, select an AP with a lightest load, or select an AP in a preset frequency band.

The sending module 22 is specifically configured to send a notification message carrying the offload policy information and carrying the second AP list, which are acquired by the acquiring module 21, to the terminal, so that the terminal enables a WiFi function, scans WLANs, acquires a first AP list, where the first AP list includes at least one AP identifier, and selects, according to the offload policy message, the WLAN corresponding to the target AP from an intersection of the first AP list and the second AP list.

Or further optionally, based on the foregoing technical solution, the receiving module 20 in the WLAN discovery and selection device provided by the embodiment shown in FIG. 9 is specifically configured to receive, from the terminal, a registration request carrying a first AP list, where the first AP list is acquired by the terminal by enabling a WiFi function and scanning WLANs, and the first AP list includes at least one AP identifier. The acquiring module 21 is specifically configured to acquire attribute information corresponding to each AP identifier; or acquire, from prestored attribute information of APs in all ACs, attribute information of each AP in all AP identifiers corresponding to location information of the terminal.

Likewise, the acquiring module 21 may also acquire the attribute information corresponding to each AP identifier by using the two manners in the foregoing method, for example, may acquire, from the prestored attribute information of the APs in all the ACs, the attribute information corresponding to each AP identifier, or acquire the attribute information corresponding to each AP identifier by interacting with an AC corresponding to each AP identifier in the first AP list. Details are not described herein again, and reference may be made to descriptions of the foregoing method embodiments.

The acquiring module 21 further identifies availability of each AP according to the attribute information corresponding to each AP identifier in the first AP list and selects a second AP list from the first AP list, where the second AP list includes at least one AP identifier available for access by the terminal and attribute information of each AP available for access by the terminal, where the attribute information includes at least one of a signal-to-noise ratio, a load, and throughput; and acquires a preset offload policy information, where the offload policy message is used to instruct to select an AP with best signal strength, select an AP with a lightest load, or select an AP in a preset frequency band.

The selecting an AP in a preset frequency band may be selecting an AP in a 2.4G frequency band or selecting an AP in a 5G frequency band. The sending module 22 is specifically configured to send a notification message carrying the offload policy information and carrying the second AP list, which are acquired by the acquiring module 21, to the terminal, so that the terminal selects, according to the offload policy message, the WLAN corresponding to the target AP from the second AP list.

Or further optionally, based on the foregoing technical solution, the receiving module 20 in the WLAN discovery and selection device provided by the embodiment shown in FIG. 9 is specifically configured to receive, from the terminal, a registration request carrying a first AP list, where the first AP list is acquired by the terminal by enabling a WiFi function and scanning WLANs, and the first AP list includes at least one AP identifier. The acquiring module 21 is specifically configured to interact with an AC corresponding to each AP identifier in the first AP list and acquire attribute information corresponding to each AP identifier, or acquire, from prestored attribute information of APs in all ACs (for the two manners, reference may be made to descriptions of the foregoing method embodiments), attribute information of each AP in the first AP list; identify availability of each AP according to the attribute information corresponding to each AP identifier in the first AP list and select a second AP list from the first AP list, where the second AP list includes at least one AP identifier available for access by the terminal and attribute information of each AP available for access by the terminal, where the attribute information includes at least one of a signal-to-noise ratio, a load, and throughput; and acquire, according to a preset offload policy information, an identifier of the target AP from the second AP list, where the offload policy message is used to instruct to select an AP with a lightest load or select an AP in a preset frequency band. The sending module 22 is specifically configured to send a notification message carrying the identifier of the target AP, which is acquired by the acquiring module 21, to the terminal.

The technical solutions of the present invention are described in detail on a basis of an assumption that the WLAN discovery and selection device provided by the foregoing embodiment includes all the foregoing optional technical solutions. In actual citations, all the foregoing optional technical solutions may be combined in any manner to constitute an optional embodiment of the present invention, and details are not described herein again.

In the WLAN discovery and selection device provided by the foregoing embodiment, an implementation mechanism for implementing WLAN discovery and selection by using the foregoing modules is the same as an implementation mechanism of the foregoing related method embodiment. Details are not described herein again, and reference may be made to descriptions of the foregoing related method embodiment.

With the WLAN discovery and selection device provided by the foregoing embodiment, by using the foregoing technical solutions, the foregoing WLAN discovery and selection operations are performed when a terminal initiates packet switched data to a cellular network, which can effectively improve efficiency of WiFi discovery and selection.

Figure 10:
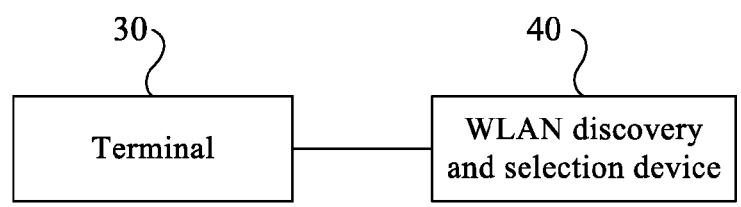
FIG. 10 is a schematic structural diagram of a WLAN discovery and selection system according to an embodiment of the present invention.

FIG. 10 is a schematic structural diagram of a WLAN discovery and selection system according to an embodiment of the present invention. As shown in FIG. 10, the WLAN discovery and selection system provided by this embodiment includes a terminal 30 and a WLAN discovery and selection device 40.

The terminal 30 is configured to send, when packet switched data is initiated to a cellular network, a registration request to the WLAN discovery and selection device 40.

The WLAN discovery and selection device 40 is configured to receive the registration request sent by the terminal 30, determine whether a WLAN needs to be used to offload the packet switched data in the packet switched data service initiated by the terminal 30 in the cellular network, acquire access parameter information when a WLAN needs to be used to offload the packet switched data in the cellular network, and send a notification message carrying the access parameter information to the terminal 30.

The terminal 30 is further configured to receive the notification message sent by the WLAN discovery and selection device 40 and select, according to the access parameter information received by a receiving module 11, a WLAN corresponding to a target AP.

Specifically, the terminal 30 provided by this embodiment may specifically use the terminal provided by the foregoing embodiment shown in FIG. 7 or FIG. 8. The WLAN discovery and selection device 40 may specifically use the WLAN discovery and selection device provided by the foregoing embodiment shown in FIG. 9. Further, the WLAN discovery and selection methods provided by the foregoing embodiments shown in FIG. 1 to FIG. 6 may be used to implement WLAN discovery and selection.

In the WLAN discovery and selection system provided by this embodiment, an implementation mechanism for implementing WLAN discovery and selection by using the foregoing terminal and WLAN discovery and selection device is the same as an implementation mechanism of the foregoing related method embodiment. Details are not described herein again, and reference may be made to descriptions of the foregoing related method embodiment.

With the WLAN discovery and selection system provided by this embodiment, by using the foregoing technical solution, a terminal and a WLAN discovery and selection device perform the foregoing WLAN discovery and selection operations when the terminal initiates packet switched data to a cellular network, which can effectively improve efficiency of WiFi discovery and selection.

With reference to the technical solutions of the foregoing embodiments, specifically, the present invention may further include the following method embodiments.

Figure 11:
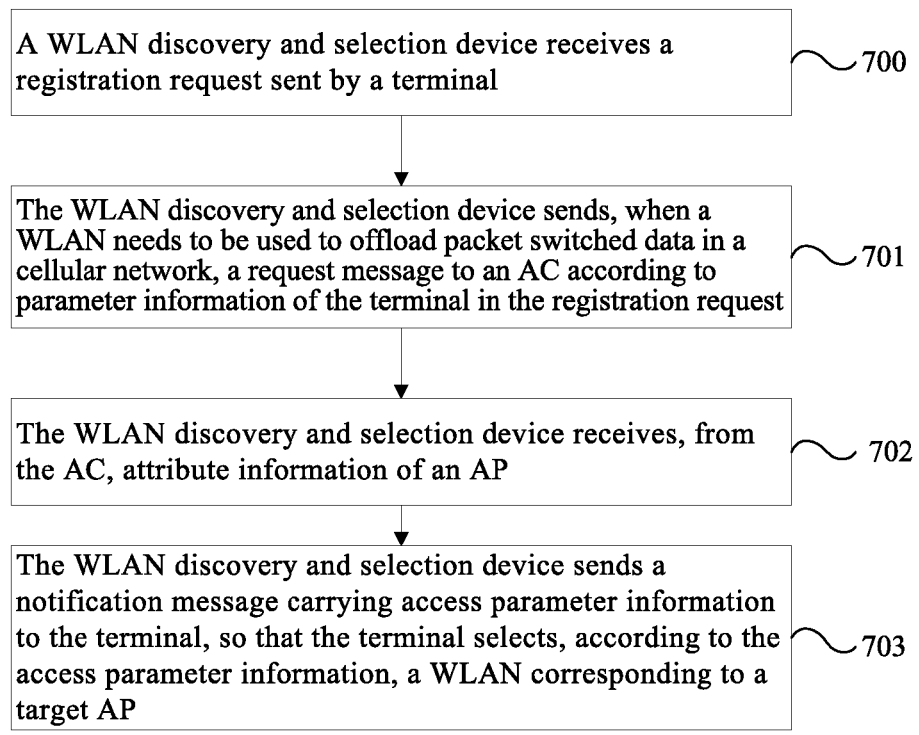
FIG. 11 is a flowchart of a WLAN discovery and selection method according to still another embodiment of the present invention.

FIG. 11 is a flowchart of a WLAN discovery and selection method according to still another embodiment of the present invention. As shown in FIG. 11, an executor of the WLAN discovery and selection method provided by this embodiment is a WLAN discovery and selection device. The WLAN discovery and selection method provided by this embodiment may specifically include the following steps:

700. A WLAN discovery and selection device receives a registration request sent by a terminal.

In this embodiment, the registration request is initiated when the terminal initiates packet switched data to a cellular network. The registration request carries parameter information of the terminal. For example, the parameter information of the terminal includes location information of the terminal, such as a cell ID of the terminal, or the parameter information of the terminal may include a first AP list, where the first AP list is acquired by the terminal by scanning WLANs. Details are not described herein again, and reference may be made to descriptions of the foregoing embodiments.

701. The WLAN discovery and selection device sends, when a WLAN needs to be used to offload the packet switched data in the cellular network, a request message to an AC according to the parameter information of the terminal in the registration request.

For example, when the registration request carries the location information of the terminal, this step may be specifically as follows: The WLAN discovery and selection device acquires, according to a correspondence between location information of a terminal and an AP, all APs corresponding to the location information of the terminal, and then sends, according to a correspondence between an AP and an AC, a request message carrying the AP identifier to an AC corresponding to each AP in all the APs to request attribute information of the AP. Or when the registration request carries the first AP list, the WLAN discovery and selection device sends, according to a correspondence between an AP and an AC, a request message carrying the AP identifier to an AC corresponding to each AP identifier in the first AP list to request attribute information of the AP.

702. The WLAN discovery and selection device receives, from the AC, the attribute information of the AP.

703. The WLAN discovery and selection device sends a notification message carrying access parameter information to the terminal, so that the terminal selects, according to the access parameter information, a WLAN corresponding to a target AP.

In this embodiment, the access parameter information is acquired according to attribute information of each AP corresponding to the parameter information of the terminal and an offload policy message.

For example, when each AP corresponding to the parameter information of the terminal is available, the access parameter information may include at least the following two parts: a second AP list including an identifier of each AP corresponding to the parameter information of the terminal, and the offload policy message.

Or, the WLAN discovery and selection device may first identify availability of each AP corresponding to the parameter information of the terminal and then use available APs to constitute a second AP list. Likewise, the access parameter information may include at least the second AP list and the offload policy message.

For example, when the registration request carries the location information of the terminal, after the WLAN discovery and selection device sends the access parameter information including the second AP list and including the offload policy message to the terminal, the terminal further needs to scan WLANs, acquire the first AP list, and select, according to the offload policy message, the WLAN of the target AP from an intersection of the first AP list and the second AP list. When the registration request carries the first AP list, the second AP list is a subset of the first AP list. After the WLAN discovery and selection device sends the access parameter information including the second AP list and including the offload policy message to the terminal, the terminal selects, according to the offload policy message, the WLAN of the target AP from the second AP list.

Or when the registration request carries the first AP list, the WLAN discovery and selection device may further select, according to the offload policy message, the target AP from the second AP list and send the access parameter information including an identifier of the target AP to the terminal so that the terminal selects the WLAN corresponding to the target AP. Details are not described herein again, and reference may be made to descriptions of the foregoing related embodiments in FIG. 1 to FIG. 10.

With the WLAN discovery and selection method provided by this embodiment, by using the foregoing technical solution, the foregoing WLAN discovery and selection operations are performed when a terminal initiates packet switched data to a cellular network, which can effectively improve efficiency of WiFi discovery and selection.

Figure 12:
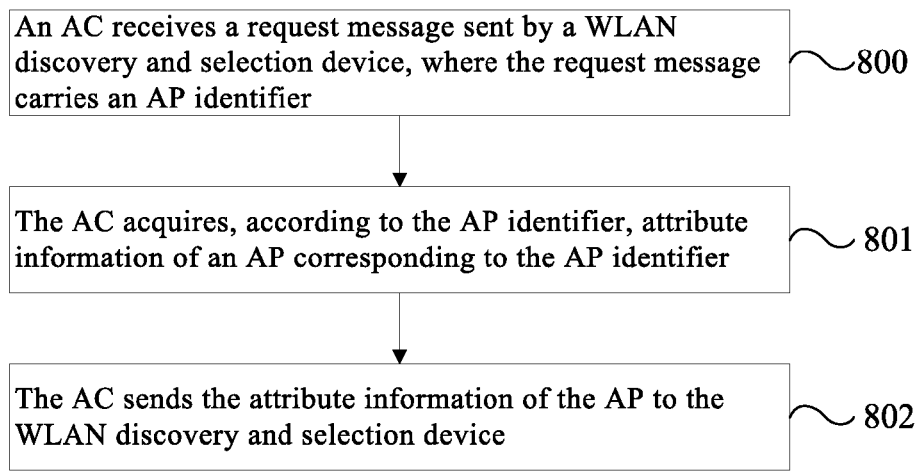
FIG. 12 is a flowchart of a WLAN discovery and selection method according to still another embodiment of the present invention.

FIG. 12 is a flowchart of a WLAN discovery and selection method according to still another embodiment of the present invention. As shown in FIG. 12, an executor of the WLAN discovery and selection method provided by this embodiment is an AC. The WLAN discovery and selection method provided by this embodiment may specifically include the following steps:

800. An AC receives a request message sent by a WLAN discovery and selection device, where the request message carries an AP identifier.

Specifically, step 800 is initiated after the WLAN discovery and selection device receives a registration request sent by a terminal. In this embodiment, when the registration request carries location information of the terminal, the AP identifier is an identifier of an AP corresponding to the location information of the terminal and is acquired according to the location information of the terminal in the registration request after the WLAN discovery and selection device receives the registration request sent by the terminal. Or when the registration request carries a first AP list that the terminal acquires by scanning WLANs, the AP identifier is an identifier of an AP in the first AP list. The WLAN discovery and selection device stores a correspondence between location information of a terminal and an AP, and a correspondence between an AP and an AC.

When the WLAN discovery and selection device acquires the AP identifier, the WLAN discovery and selection device may send, according to the correspondence between an AP and an AC, the request message to a corresponding AC to request attribute information of the AP. In this embodiment, a technical solution of the present invention is described in detail on a basis of an assumption that one AC is the executor. In actual applications, for each AC, the technical solution provided by this embodiment may be used for implementation.

801. The AC acquires, according to the AP identifier, attribute information of an AP corresponding to the AP identifier.

802. The AC sends the attribute information of the AP to the WLAN discovery and selection device.

Specifically, reference is made to descriptions of the foregoing related embodiment. In this embodiment, the AC sends the attribute information of the AP to the WLAN discovery and selection device. In this way, the WLAN discovery and selection device may identify availability of an AP according to the attribute information of the AP, use an available AP to form a second AP list, and send access parameter information including the second AP list and including an offload policy message to the terminal, so that the terminal selects, according to the access parameter information, a WLAN corresponding to a target AP.

A difference between the WLAN discovery and selection method provided by this embodiment and the foregoing embodiment shown in FIG. 11 only lies in that: this embodiment describes a technical solution of the present invention on an AC side. Details are not described herein again, and reference may be made to descriptions of the foregoing embodiment shown in FIG. 11 or reference may be made to descriptions of the foregoing related embodiments in FIG. 1 to FIG. 10.

With the WLAN discovery and selection method provided by this embodiment, by using the foregoing technical solution, the foregoing WLAN discovery and selection operations are performed when a terminal initiates packet switched data to a cellular network, which can effectively improve efficiency of WiFi discovery and selection.

Figure 13:
FIG. 13 is a schematic structural diagram of a WLAN discovery and selection device according to still another embodiment of the present invention.

FIG. 13 is a schematic structural diagram of a WLAN discovery and selection device according to still another embodiment of the present invention. As shown in FIG. 13, the WLAN discovery and selection device provided by this embodiment may specifically include a receiving module 50 and a sending module 51.

The receiving module 50 is configured to receive a registration request sent by a terminal. The registration request is initiated when the terminal initiates packet switched data to a cellular network. The registration request carries parameter information of the terminal. For example, the parameter information of the terminal includes location information of the terminal, such as a cell ID of the terminal, or the parameter information of the terminal may include a first AP list, where the first AP list is acquired by the terminal by scanning WLANs. The sending module 51 is connected to the receiving module 50.

The sending module 51 is configured to send, when a WLAN needs to be used to offload the packet switched data in the cellular network, a request message to an AC according to the parameter information of the terminal in the registration request received by the receiving module 50. The receiving module 50 is further configured to receive, from the AC, attribute information of an AP. The sending module 51 is configured to send a notification message carrying access parameter information to the terminal so that the terminal selects, according to the access parameter information, a WLAN corresponding to a target AP. The access parameter information is acquired according to attribute information of each AP corresponding to the parameter information of the terminal and an offload policy message.

In the WLAN discovery and selection device provided by this embodiment, an implementation mechanism for implementing WLAN discovery and selection by using the foregoing modules is the same as an implementation mechanism of the foregoing related method embodiment. Details are not described herein again, and reference may be made to descriptions of the foregoing related method embodiment.

With the WLAN discovery and selection device provided by this embodiment, by using the foregoing technical solution, a terminal and a WLAN discovery and selection device perform the foregoing WLAN discovery and selection operations when the terminal initiates packet switched data to a cellular network, which can effectively improve efficiency of WiFi discovery and selection.

Figure 14:
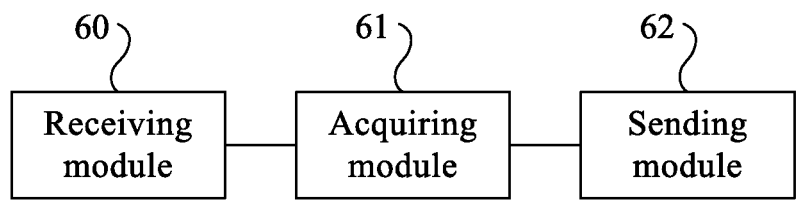
FIG. 14 is a schematic structural diagram of an AC according to an embodiment of the present invention.

FIG. 14 is a schematic structural diagram of an AC according to an embodiment of the present invention. As shown in FIG. 14, the AC provided by this embodiment may specifically include a receiving module 60, an acquiring module 61, and a sending module 62.

The receiving module 60 is configured to receive a request message sent by a WLAN discovery and selection device, where the request message carries an AP identifier. The acquiring module 61 is connected to the receiving module 60. The acquiring module 61 is configured to acquire, according to the AP identifier received by the receiving module 60, attribute information of a corresponding AP. The sending module 62 is connected to the acquiring module 61. The sending module is configured to send the attribute information of the AP, which is acquired by the acquiring module 61, to the WLAN discovery and selection device.

In the AC provided by this embodiment, an implementation mechanism for implementing WLAN discovery and selection by using the foregoing modules is the same as an implementation mechanism of the foregoing related method embodiment. Details are not described herein again, and reference may be made to descriptions of the foregoing related method embodiment.

With the AC provided by this embodiment, by using the foregoing technical solution, a terminal and a WLAN discovery and selection device perform the foregoing WLAN discovery and selection operations when the terminal initiates packet switched data to a cellular network, which can effectively improve efficiency of WiFi discovery and selection.

Figure 15:
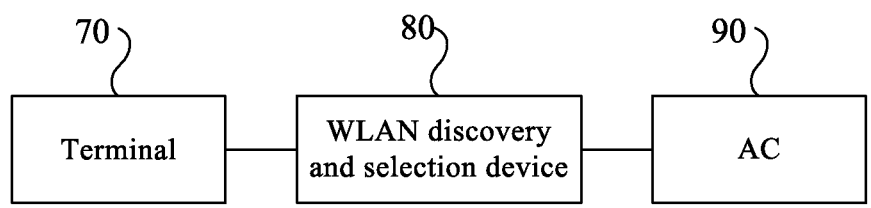
FIG. 15 is a schematic structural diagram of a WLAN discovery and selection system according to another embodiment of the present invention.

FIG. 15 is a schematic structural diagram of a WLAN discovery and selection system according to another embodiment of the present invention. As shown in FIG. 15, the WLAN discovery and selection system provided by this embodiment includes a terminal 70, a WLAN discovery and selection device 80, and an AC 90. The WLAN discovery and selection device 80 is connected to the terminal 70 and the AC 90.

For example, the terminal 70 is configured to send a registration request to the WLAN discovery and selection device 80. The registration request is initiated when the terminal 70 initiates packet switched data to a cellular network. The registration request carries parameter information of the terminal 70. For example, the parameter information of the terminal includes location information of the terminal 70, such as a cell ID of the terminal 70, or the parameter information of the terminal 70 may include a first AP list, where the first AP list is acquired by the terminal 70 by scanning WLANs.

The WLAN discovery and selection device 80 receives the registration request sent by the terminal 70 and sends, when a WLAN needs to be used to offload the packet switched data in the cellular network, a request message to the AC 90 according to the parameter information of the terminal in the received registration request.

The AC 90 is configured to receive the request message sent by the WLAN discovery and selection device 80, acquire, according to a received AP identifier, attribute information of a corresponding AP, and send the acquired attribute information of the AP to the WLAN discovery and selection device 80.

The WLAN discovery and selection device 80 is further configured to send a notification message carrying access parameter information to the terminal 70.

The terminal 70 is further configured to receive, from the WLAN discovery and selection device 80, the notification message carrying the access parameter information and select, according to the access parameter information, a WLAN corresponding to a target AP. The access parameter information is acquired according to attribute information of each AP corresponding to the parameter information of the terminal and an offload policy message.

Specifically, the WLAN discovery and selection device 80 provided by this embodiment may use the foregoing WLAN discovery and selection device shown in FIG. 13. The AC 90 may use the foregoing AC shown in FIG. 14. In addition, the foregoing WLAN discovery and selection method shown in FIG. 11 or FIG. 12 may be used to implement WLAN discovery and selection. Details are not described herein again, and reference may be made to descriptions of the foregoing embodiments. Further, for a mechanism for implementing WLAN discovery and selection by using the terminal 70, the WLAN discovery and selection device 80, and the AC 90 provided by this embodiment, reference may be made to descriptions of the foregoing embodiments shown in FIG. 1 to FIG. 10, and details are not described herein again.

In the WLAN discovery and selection system provided by this embodiment, an implementation mechanism for implementing WLAN discovery and selection by using the foregoing terminal, WLAN discovery and selection device, and AC is the same as an implementation mechanism of the foregoing related method embodiment. Details are not described herein again, and reference may be made to descriptions of the foregoing related method embodiment.

With the WLAN discovery and selection system provided by this embodiment, by using the foregoing technical solution, a terminal, a WLAN discovery and selection device, and an AC perform the foregoing WLAN discovery and selection operations when the terminal initiates packet switched data to a cellular network, which can effectively improve efficiency of WiFi discovery and selection.

The technical solutions provided by the foregoing embodiments shown in FIG. 11 to FIG. 15 are technical solutions involving interaction between a WLAN discovery and selection device and an AC in the foregoing technical solutions shown in FIG. 1 to FIG. 10. Therefore, all technical solutions involving the AC in FIG. 1 to FIG. 10 are applicable to the foregoing embodiments shown in FIG. 11 to FIG. 15, and details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A wireless local area network discovery and selection method, comprising:
    scanning wireless local area networks and acquiring a first wireless access point list, wherein the first wireless access point list comprises at least one wireless access point identifier and signal strength of each wireless access point in the at least one wireless access point identifier;
    sending a registration request to a wireless local area network discovery and selection device when packet switched data is initiated to a cellular network, wherein the registration request carries location information of a terminal and the first wireless access point list;
    receiving a notification message sent by the wireless local area network discovery and selection device, wherein the notification message carries access parameter information, wherein the access parameter information comprises an offload policy message and a second wireless access point list, wherein the second wireless access point list is acquired by the wireless local area network discovery and selection device by:
        acquiring attribute information of each wireless access point in all wireless access point identifiers corresponding to the location information of the terminal upon reception of the registration request, the attribute information being acquired from one or more access controllers that correspond to the each wireless access point in all the wireless access point identifiers corresponding to the location information of the terminal, wherein the attribute information comprises at least one of a signal-to-noise ratio, a load, and throughput; and
        identifying availability of each wireless access point according to the attribute information of each wireless access point in all the wireless access point identifiers corresponding to the location information of the terminal, wherein the second wireless access point list comprises at least one wireless access point identifier available for access by the terminal and attribute information of each wireless access point available for access by the terminal; and
    selecting, according to the access parameter information, a target wireless access point, wherein selecting the target wireless access point according to the access parameter information comprises selecting, according to the offload policy message, the target wireless access point from the second wireless access point list, wherein the offload policy message is used to instruct to select a wireless access point with a highest signal strength, select a wireless access point with a smallest load, or select a wireless access point in a preset frequency band.

2. The method according to claim 1, wherein selecting the target wireless access point further comprises selecting, according to the offload policy message, the target wireless access point from the second wireless access point list and the target wireless access point and from the first wireless access point list.

3. The method according to claim 2, wherein the at least one wireless access point identifier available for access by the terminal in the second wireless access point list comprises a service set identifier of a wireless access point of an available wireless local area network; the first wireless access point list further comprises a service set identifier of each wireless access point in the at least one wireless access point identifier of the first wireless access point list; and
    wherein selecting the target wireless access point comprises selecting, according to the offload policy message, the service set identifier of the wireless access point of the wireless local area network of the second wireless access point list, and the first wireless access point list, the target wireless access point from the second wireless access point list and from the first wireless access point list.

4. The method according to claim 1, wherein selecting the target wireless access point comprises selecting, according to the offload policy message, the target wireless access point from an intersection of the first wireless access point list and the second wireless access point list.

5. The method according to claim 1, wherein after selecting the target wireless access point according to the access parameter information, the method further comprises determining, when the target wireless access point is not detected within a first preset time segment, that offload fails, and disabling a Wireless Fidelity function; or the method further comprises disabling the Wireless Fidelity function when no data traffic of the packet switched data is detected within a second preset time segment; or the method further comprises:
detecting, when the wireless local area network can be accessed by using the target wireless access point, a speed in the wireless local area network;
determining whether the speed is lower than a preset speed threshold; and
in response to determining that the speed is lower than the preset speed threshold, disabling the Wireless Fidelity function.

6. A wireless local area network discovery and selection method, comprising:
receiving a registration request sent by a terminal, wherein the registration request is initiated when the terminal initiates packet switched data to a cellular network;
after receiving the registration request sent by the terminal and before acquiring any access parameter information, determining whether the packet switched data in the cellular network needs to be offloaded, wherein determining whether the packet switched data in the cellular network needs to be offloaded comprises:
acquiring, from a home location register, a priority of a user of the terminal;
determining whether the priority of the user of the terminal is higher than or equal to a preset priority threshold;
when the priority of the user of the terminal is higher than or equal to the preset priority threshold, determining that the packet switched data in the cellular network does not need to be offloaded; and
when the priority of the user of the terminal is not higher than or equal to the preset priority threshold determining that the packet switched data in the cellular network may needs to be offloaded;
acquiring the access parameter information in response to determining that the packet switched data in the cellular network needs to be offloaded; and
sending a notification message carrying the access parameter information to the terminal so that the terminal selects, according to the access parameter information, a target wireless access point.

7. The method according to claim 6, wherein determining whether the packet switched data in the cellular network needs to be offloaded further comprises:
acquiring, from a network element in the cellular network or a network element in a core network, a service type of the packet switched data; and
determining, according to the service type, whether the packet switched data in the cellular network needs to be offloaded.

8. The method according to claim 6, wherein acquiring the access parameter information comprises acquiring an offload policy message, wherein the offload policy message is used to instruct to select a wireless access point with a highest signal strength or select a wireless access point in a preset frequency band; and
wherein sending the notification message carrying the access parameter information to the terminal comprises sending a notification message carrying the offload policy message to the terminal, so that the terminal scans wireless local area networks, acquires a first wireless access point list, wherein the first wireless access point list comprises at least one wireless access point identifier and signal strength of each wireless access point or a frequency band of each wireless access point, and selects, according to the offload policy message, the target wireless access point from the first wireless access point list.

9. The method according to claim 6, wherein acquiring the access parameter information comprises acquiring an offload policy message and a service set identifier of a wireless access point of a wireless local area network available for access by the terminal, wherein the offload policy message is used to instruct to select a wireless access point with a highest signal strength or select a wireless access point in a preset frequency band; and
wherein sending the notification message carrying the access parameter information to the terminal comprises sending a notification message carrying the offload policy message and carrying the service set identifier of the wireless access point of the wireless local area network to the terminal, so that the terminal scans wireless local area networks, acquires a first wireless access point list, wherein the first wireless access point list comprises at least one wireless access point identifier, a service set identifier of a wireless access point of a wireless local area network corresponding to each wireless access point, and signal strength of each wireless access point or a frequency band of each wireless access point or both, and selects, according to the offload policy message, the service set identifier of the wireless access point of the wireless local area network, and the first wireless access point list, the target wireless access point from the first wireless access point list.

10. The method according to claim 6, wherein the registration request carries location information of the terminal;
wherein acquiring the access parameter information comprises:
acquiring all wireless access point identifiers corresponding to the location information of the terminal;
acquiring attribute information of each wireless access point in all the wireless access point identifiers corresponding to the location information of the terminal, wherein the attribute information comprises at least one of a signal-to-noise ratio, a load, and throughput; and
identifying availability of each wireless access point according to the attribute information corresponding to each wireless access point in all the wireless access point identifiers corresponding to the location information of the terminal, acquiring a second wireless access point list, wherein the second wireless access point list comprises at least one wireless access point identifier available for access by the terminal and attribute information of each wireless access point available for access by the terminal, and acquiring a preset offload policy message, wherein the preset offload policy message is used to instruct to select a wireless access point with a highest signal strength, select a wireless access point with a smallest load, or select a wireless access point in a preset frequency band; and
wherein sending the notification message carrying the access parameter information to the terminal comprises sending a notification message carrying offload policy information and carrying the second wireless access point list to the terminal, so that the terminal scans wireless local area networks, acquires a first wireless access point list, wherein the first wireless access point list comprises at least one wireless access point identifier, and selects, according to the offload policy message, the target wireless access point from an intersection of the first wireless access point list and the second wireless access point list.

11. The method according to claim 10, wherein acquiring the attribute information of each wireless access point in all the wireless access point identifiers corresponding to the location information of the terminal comprises:
acquiring, from prestored attribute information of wireless access points in all access controllers, the attribute information of each wireless access point in all the wireless access point identifiers corresponding to the location information of the terminal; or
interacting, according to all the wireless access point identifiers corresponding to the location information of the terminal, with an access controller corresponding to each wireless access point identifier and acquiring the attribute information of each wireless access point in all the wireless access point identifiers corresponding to the location information of the terminal.

12. The method according to claim 6, wherein the registration request carries a first wireless access point list, wherein the first wireless access point list is acquired by the terminal by scanning wireless local area networks and the first wireless access point list comprises at least one wireless access point identifier;
wherein acquiring the access parameter information comprises:
acquiring attribute information corresponding to each wireless access point identifier, wherein the attribute information comprises at least one of a signal-to-noise ratio, a load, and throughput;
identifying availability of each wireless access point according to the attribute information corresponding to each wireless access point identifier in the first wireless access point list, and selecting a second wireless access point list from the first wireless access point list, wherein the second wireless access point list comprises at least one wireless access point identifier available for access by the terminal and attribute information of each wireless access point available for access by the terminal; and
acquiring a preset offload policy information, wherein offload policy message is used to instruct to select a wireless access point with a highest signal strength, select a wireless access point with a smallest load, or select a wireless access point in a preset frequency band; and
wherein sending the notification message carrying the access parameter information to the terminal comprises sending a notification message carrying the offload policy information and carrying the second wireless access point list to the terminal, so that the terminal selects, according to the offload policy message, to the target wireless access point from the second wireless access point list.

13. The method according to claim 6, wherein the registration request carries a first wireless access point list; wherein the first wireless access point list is acquired by the terminal by scanning wireless local area networks and the first wireless access point list comprises at least one wireless access point identifier;

wherein acquiring the access parameter information comprises:
acquiring attribute information corresponding to each wireless access point identifier, wherein the attribute information comprises at least one of a signal-to-noise ratio, a load, and throughput;
identifying availability of each wireless access point according to the attribute information corresponding to each wireless access point identifier in the first wireless access point list, and selecting a second wireless access point list from the first wireless access point list, wherein the second wireless access point list comprises at least one wireless access point identifier available for access by the terminal and attribute information of each wireless access point available for access by the terminal; and
acquiring, according to a preset offload policy information, an identifier of the target wireless access point from the second wireless access point list, wherein offload policy message is used to instruct to select a wireless access point with a smallest load or select a wireless access point in a preset frequency band; and
wherein sending the notification message carrying the access parameter information to the terminal comprises sending a notification message carrying the identifier of the target wireless access point to the terminal.

14. A terminal, comprising:
a transmitter, configured to send, when packet switched data is initiated to a cellular network, a registration request to a wireless local area network discovery and selection device, wherein the registration request carries location information of the terminal to the wireless local area network discovery and selection device;
a receiver, configured to receive a notification message sent by the wireless local area network discovery and selection device, wherein the notification message carries access parameter information, wherein the access parameter information carries an offload policy message, and wherein the offload policy message is used to instruct to select a wireless access point with a highest signal strength or select a wireless access point in a preset frequency band, and wherein the notification message further carries a second wireless access point list, wherein the second wireless access point list is acquired by the wireless local area network discovery and selection device by acquiring attribute information of each wireless access point in all wireless access point identifiers corresponding to the location information of the terminal upon reception of the registration request and identifying availability of each wireless access point according to the attribute information of each wireless access point in all the wireless access point identifiers corresponding to the location information of the terminal, the second wireless access point list comprises at least one wireless access point identifier available for access by the terminal and attribute information of each wireless access point available for access by the terminal, wherein the attribute information comprises at least one of a signal-to-noise ratio, a load, and throughput, and the offload policy message is used to instruct to select a wireless access point with a highest signal strength, select a wireless access point with a smallest load, or select a wireless access point in a preset frequency band;
a processor; and a computer-readable storage medium storing a program to be executed by the processor, the program including instructions for:

scanning wireless local area networks in response to receiving the notification message, and acquiring a first wireless access point list, wherein the first wireless access point list comprises at least one wireless access point identifier and signal strength of each wireless access point or a frequency band of each wireless access point in the first wireless access point list or both; and selecting, according to the access parameter information and the offload policy message, a target wireless access point from the second wireless access point list.

15. The terminal according to claim 14, wherein the program further includes instructions for:

determining, after selecting the target wireless access point according to the access parameter information and the offload policy message, that offload fails when the target wireless access point is not detected within a first preset time segment, and disabling a Wireless Fidelity function; or after selecting the target wireless access point according to the access parameter information and the offload policy message, the Wireless Fidelity function when no data traffic of the packet switched data is detected within a second preset time segment.

16. The terminal according to claim 14, wherein the program further includes instructions for:

detecting, after selecting the target wireless access point according to the access parameter information and the offload policy message and when the wireless local area network can be accessed by using the target wireless access point, a speed in the wireless access local network;

determining determine whether the speed is lower than a preset speed threshold; and when the speed is lower than the preset speed threshold, disabling the Wireless Fidelity function.

17. The terminal according to claim 14, wherein the notification message further carries a service set identifier of a wireless access point of an available wireless local area network;

wherein the first wireless access point list further comprises a service set identifier of a wireless access point of a wireless local area network corresponding to each wireless access point in the at least one wireless access point identifier; and wherein the program further includes instructions for selecting, according to the offload policy message, the service set identifier of the wireless access point of the wireless local area network, and the first wireless access point list, the target wireless access point from the first wireless access point list.

18. The terminal according to claim 14, wherein:

the program further includes instructions for selecting, according to the offload policy message, the target wireless access point from an intersection of the first wireless access point list and the second wireless access point list.

19. A wireless local area network discovery and selection device, comprising:

a receiver, configured to receive a registration request sent by a terminal, wherein the registration request is initiated when the terminal initiates packet switched data to a cellular network, wherein the registration request carries location information of the terminal, and wherein the registration request carries a first wireless access point list, wherein the first wireless access point list is acquired by the terminal by scanning wireless local area networks and the first wireless access point list comprises at least one wireless access point identifier;

a processor; and a computer-readable storage medium storing a program to be executed by the processor, the program including instructions for:

acquiring access parameter information when a wireless local area network needs to be used to offload the packet switched data in the cellular network, wherein acquiring the access parameter information comprises:

acquiring attribute information corresponding to each wireless access point identifier in the first wireless access point list, wherein the attribution information is acquired from one or more access controllers corresponding to each wireless access point identifier in the first wireless access point list, and wherein the attribute information comprises at least one of a signal-to-noise ratio, a load, and throughput;

identifying availability of each wireless access point according to the attribute information corresponding to each wireless access point identifier in the first wireless access point list;

acquiring a second wireless access point list, wherein the second wireless access point list comprises at least one wireless access point identifier available for access by the terminal and attribute information of each wireless access point available for access by the terminal; and acquiring a preset offload policy information, wherein the preset offload policy information is used to instruct to select a wireless access point with a highest signal strength, select a wireless access point with a smallest load, or select a wireless access point in a preset frequency band; and a transmitter, configured to send a notification message carrying the access parameter information to the terminal so that the terminal selects, according to the access parameter information, a target wireless access point, wherein sending the notification message carrying the access parameter information to the terminal comprises sending a notification message carrying the offload policy information and carrying the second wireless access point list to the terminal, so that the terminal selects, according to the offload policy message, to the target wireless access point from the second wireless access point list.

20. The device according to claim 19, wherein the program further includes instructions for determining, after receiving the registration request sent by the terminal and before acquiring the access parameter information when the wireless local area network needs to be used to offload the packet switched data in the cellular network, whether the wireless local area network needs to be used to offload the packet switched data in the cellular network.

21. The device according to claim 20, wherein the program further includes instructions for acquiring, from a network element in the cellular network or a network element in a core network, a service type of the packet switched data and determining, according to the service type, whether the wireless local area network needs to be used to offload the packet switched data in the cellular network.

22. The device according to claim 21, wherein the program further includes instructions for acquiring, from a home location register, a priority of a user corresponding to the terminal; determining whether the priority of the user corresponding to the terminal is higher than or equal to a preset priority threshold; and determining, when the priority of the user corresponding to the terminal is higher than or equal to the preset priority threshold, that the wireless local area network does not need to be used to offload the packet switched data in the cellular network; or otherwise, determining, when the priority of the user corresponding to the terminal is lower than the preset priority threshold, that the wireless local area network needs to be used to offload the packet switched data in the cellular network.

* * * * *

UNITED STATES PATENT AND TRADEMARK OFFICE
CERTIFICATE OF CORRECTION

PATENT NO.         : 9,648,550 B2
APPLICATION NO.    : 14/511707
DATED              : May 9, 2017
INVENTOR(S)        : Zhao et al.

It is certified that error appears in the above-identified patent and that said Letters Patent is hereby corrected as shown below:

In the Claims

In Column 38, Lines 41-42, Claim 2, delete "second wireless access point list and the target wireless access point and from the first wireless access point list" and insert --second wireless access point list and from the first wireless access point list--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*